United States Patent
Ono et al.

(10) Patent No.: US 8,089,493 B2
(45) Date of Patent: Jan. 3, 2012

(54) IMAGE PROCESSING CIRCUIT, DISPLAY DEVICE, AND PRINTING DEVICE

(75) Inventors: Yoshiyuki Ono, Hino (JP); Takashi Sawazaki, Chofu (JP); Akira Saito, Sagamihara (JP)

(73) Assignee: Seiko Epson Corporation, Tokyo (JP)

( * ) Notice: Subject to any disclaimer, the term of this patent is extended or adjusted under 35 U.S.C. 154(b) by 780 days.

(21) Appl. No.: 12/222,363

(22) Filed: Aug. 7, 2008

(65) Prior Publication Data
US 2009/0046948 A1 Feb. 19, 2009

(30) Foreign Application Priority Data

Aug. 14, 2007 (JP) .................................. 2007-211252
Aug. 14, 2007 (JP) .................................. 2007-211253
Aug. 14, 2007 (JP) .................................. 2007-211256

(51) Int. Cl.
G09G 5/00 (2006.01)

(52) U.S. Cl. ........ 345/643; 345/581; 345/582; 345/588; 345/589; 345/549; 382/167; 382/170

(58) Field of Classification Search .......................... None
See application file for complete search history.

(56) References Cited

U.S. PATENT DOCUMENTS

2005/0168473 A1* 8/2005 Nishi ........................... 345/562

FOREIGN PATENT DOCUMENTS

| JP | A-3-28984 | 2/1991 |
| JP | A-5-210381 | 8/1993 |
| JP | A-07-302070 | 11/1995 |
| JP | A-10-31735 | 2/1998 |
| JP | A-11-306366 | 11/1999 |
| JP | A-2009-48247 | 3/2009 |
| JP | A-2009-48248 | 3/2009 |

* cited by examiner

Primary Examiner — Antonio A Caschera
(74) Attorney, Agent, or Firm — Oliff & Berridge, PLC

(57) ABSTRACT

An image processing circuit includes: a storage unit; a first multiplication unit that multiplies a pixel value stored in the storage unit, by a pixel value included in input image data, the input image data expressing the pixel values; a subtraction value output unit that outputs a pixel value obtained by subtracting a pixel value at each of the positions in the input image data, from a maximum pixel value in the input image data; a second multiplication unit that multiplies a pixel value included in the input image data or a pixel value included in background image data, by the pixel value output by the subtraction value output unit; and an adder unit that adds up a multiplication result of the first and second multiplication units and outputs addition results as output image data.

15 Claims, 19 Drawing Sheets

IMAGE PROCESSING CIRCUIT, DISPLAY DEVICE, AND PRINTING DEVICE

CROSS REFERENCE TO RELATED APPLICATIONS

The entire disclosures of Japanese Patent Applications No. 2007-211252 filed on Aug. 14, 2007, No. 2007-211253 filed on Aug. 14, 2007 and No. No. 2007-211256 filed on Aug. 14, 2007 are expressly incorporated by reference herein.

BACKGROUND

1. Technical Field

The present invention relates to a technology for laying out plural shape-images in an array within an image area.

2. Related Art

In the field of image processing, there is a technique known as hatching processing. Hatching processing involves the laying out of plural shape-images in an array within an image area which is defined as a text area, a table, or a figure. In other words, the technique of hatching processing is a process of patterning or a form of shading. For example, JP-A-05(1993)-210381 discloses a technique for rapidly developing a hatching pattern on a frame memory by using a BiTBLT (bit boundary/block transfer) circuit which repeatedly transfers a block pattern for hatching within a specified area.

SUMMARY

The technique described in JP-A-05(1993)-210381 is suitable for a case of performing a hatching processing on an area having the same size as an integral multiple of a size of a block pattern. In other cases, however, the hatching processing is not effective. For example, a hatching processing can be performed even on an area of an arbitrary size by greatly reducing the size of a block pattern. Even then, addresses of the area as a transfer destination of the block pattern need to be specified precisely, one by one. Therefore, operations and processings for specifying the transfer destination are very complicated when performing a hatching processing on an image which has a complex shape such as a text.

The invention is directed to providing a technology capable of laying out plural shape-images in image areas of various sizes.

According to one aspect of the invention, there is provided an image processing circuit including: a storage unit that stores positions of respective pixels, and pixel values of the pixels, the pixels forming a plurality of shape-images which are to be laid out in an array; a first multiplication unit that multiplies a pixel value from among the pixel values stored in the storage unit, by a pixel value from among pixel values included in input image data, for each of the respectively corresponding positions to both the positions stored and positions of pixels included in the input image data, the input image data expressing the pixel values; a subtraction value output unit that outputs a pixel value which is obtained by subtracting a pixel value at each of the positions in the input image data, from a maximum pixel value in the input image data; a second multiplication unit that multiplies a pixel value from among the pixel values included in the input image data or a pixel value included in background image data, by the pixel value inverted by the subtraction value output unit, for each of the respectively corresponding positions, the background image data being a background of an image based on the input image data; and an adder unit that adds up a multiplication result of the first multiplication unit and a multiplication result of the second multiplication unit, for each of the respectively corresponding positions, and outputs addition results as output image data.

According to the image processing circuit, a plurality of shape-images are laid-out in an area regardless of the size or shape of the area.

It is preferred that the storage unit includes: a first storage unit that stores the positions of the respective pixels forming the plurality of shape-images; a second storage unit that stores color information indicating a color of the shape images, as a pixel value of each of the pixels forming the plurality of shape-images; and a color information output unit that outputs the color information stored in the second storage unit, as a pixel value of each of the pixels at the positions stored in the first storage unit.

According to the image processing circuit, a plurality of shape-images, whose color is stored in the second storage unit, are laid-out in an area regardless of the size or shape of the area.

It is preferred that the second storage unit stores plural types of color information, and the color information output unit outputs one of the plural types of color information stored in the second storage unit, for each of the pixels forming one type of the plurality of shape images among the plural shape images.

According to the image processing circuit, a plurality of shape-images having one of the plural types of color information stored in the second storage unit, are laid-out in an area regardless of the size or shape of the area.

It is preferred that the image processing circuit further includes: a specifying unit that specifies either a pixel value at each of the positions in the input image data or a pixel value at each of the positions in the background image data expressing the background of the image of the input image data; and a supply unit that supplies the second multiplication unit with the pixel value specified by the specifying unit.

According to the image processing circuit, either a pixel value at each of the positions in the input image data or a pixel value at each of the positions in the background image data expressing the background of the image of the input image data us identified.

It is preferred that the image processing circuit further includes: a specifying unit that specifies either a third storage unit that stores predetermined background color information or a fourth storage unit that stores image information to be output to a display unit or a printing unit; and a supply unit that reads information stored in the third or fourth storage unit specified by the specifying unit, as pixel values included in the background image data, and supplies the second multiplication unit with the pixel values.

According to the image processing circuit, either the third storage unit or the fourth storage unit is identified as a supply source of the background image.

It is preferred that the input data expresses the pixel values by using two values including zero.

It is preferred that the input data expresses the pixel values by using multiple values including zero.

It is preferred that the image processing circuit further includes: an obtaining unit that is provided outside the image processing circuit, obtains input image data from an external storage unit through an external bus provided outside the image processing circuit, the external storage unit storing the input image data, wherein the storage unit is an internal storage unit that is provided inside the image processing circuit, and the first multiplication unit is configured to multiply a pixel value from among pixel values included in the input image data obtained by the obtaining unit, by a pixel value which is read out from the internal storage unit, for each of respectively corresponding positions to both positions of pixels in the input image data and the positions of the pixels stored in the internal storage unit.

According to the image processing circuit, the hatching processing is performed faster than a configuration by which the plurality of shape-images are input via an external bus.

It is preferred that the internal storage unit is provided in a plurality, the plurality of the internal storage units store the positions of the pixels and the pixel values at the positions, respectively for the plurality of shape-images, a specifying unit that specifies one of the plurality of the internal storage units, the image processing circuit further comprises a supply unit that supplies the first multiplication unit with a pixel value at each of the positions, which is read from the one of the plurality of the internal storage units, specified by the specifying unit, and the first multiplication unit multiplies the pixel value supplied from the supply unit, by a pixel value from among the pixel values included in the input image data obtained by the obtaining unit, for each of the respectively corresponding positions.

According to the image processing circuit, one of the plurality of internal storage unit is identified as a supply source of the plurality of shape-images.

It is preferred that the storage unit includes: a first storage unit that stores the positions of the respective pixels forming the plurality of shape-images; a second storage unit that stores color information indicating a color of the shape images, as a pixel value of each of the pixels forming the plurality of shape images; and a color information output unit that outputs the color information stored in the second storage unit, as a pixel value of each of the pixels at the positions stored in the first storage unit.

According to the image processing circuit, a plurality of shape-images, whose color is stored in the second storage unit, are laid-out in an area regardless of the size or shape of the area.

It is preferred that the second storage unit stores plural types of color information, and the second storage unit outputs one of the plural types of color information stored in the second storage unit, for each of the pixels forming one type of the plurality of shape images among the plural shape images.

According to the image processing circuit, a plurality of shape-images having one of the plural types of color information stored in the second storage unit, are laid-out in an area regardless of the size or shape of the area.

It is preferred that the image processing circuit further includes: a specifying unit that specifies either a pixel value at each of the positions in the input image data or a pixel value at each of the positions in the background image data expressing the background of the image of the input image data; and a supply unit that supplies the second multiplication unit with the pixel value specified by the specifying unit.

According to the image processing circuit, either a pixel value at each of the positions in the input image data or a pixel value at each of the positions in the background image data expressing the background of the image of the input image data us identified.

It is preferred that the image processing circuit further includes: a specifying unit that specifies either a third storage unit that stores predetermined background color information or a fourth storage unit that stores image information to be output to a display unit or a printing unit; and a supply unit that reads information stored in the third or fourth storage unit specified by the specifying unit, as pixel values included in the background image data, and supplies the second multiplication unit with the pixel values.

According to the image processing circuit, either the third storage unit or the fourth storage unit is identified as a supply source of the background image.

According to another aspect of the invention, there is provided a display device including: the image processing circuit described above; and a display unit that displays an image, based on the output image data which is output from the adder unit.

According to the display device, a plurality of shape-images are laid-out in an area regardless of the size or shape of the area.

According to yet another aspect of the invention, there is provided a printing device including: the image processing circuit described above; and a display unit that prints out an image, based on the output image data which is output from the adder unit.

According to the printing device, a plurality of shape-images are laid-out in an area regardless of the size or shape of the area.

BRIEF DESCRIPTION OF THE DRAWINGS

The invention will be described with reference to the accompanying drawings, wherein like numbers reference like elements.

DETAILED DESCRIPTION

1. First Embodiment

In the first embodiment described below, a processing for laying out plural shape-images in an array within an image area will be referred to as "hatching". The plural shape-images which are arrayed in this processing may all be the same as each other or different from each other. For example, a form of hatching referred to as an "oblique line shading" can be achieved by repeatedly laying out at uniform intervals, line segment images extending in one identical direction. Another form of hatching simply called "cross shading" can be achieved by repeatedly laying out at uniform intervals, line segment images respectively extending in two different directions. Yet another form of hatching can be achieved by alternately laying out shapes of a heart and a clover or by randomly laying out abstract shapes which are all different from each other. That is, shape-images used for hatchings can be of any size or form, and any number of shape-images may be used for hatchings.

1-1. Configuration

Figure 1:
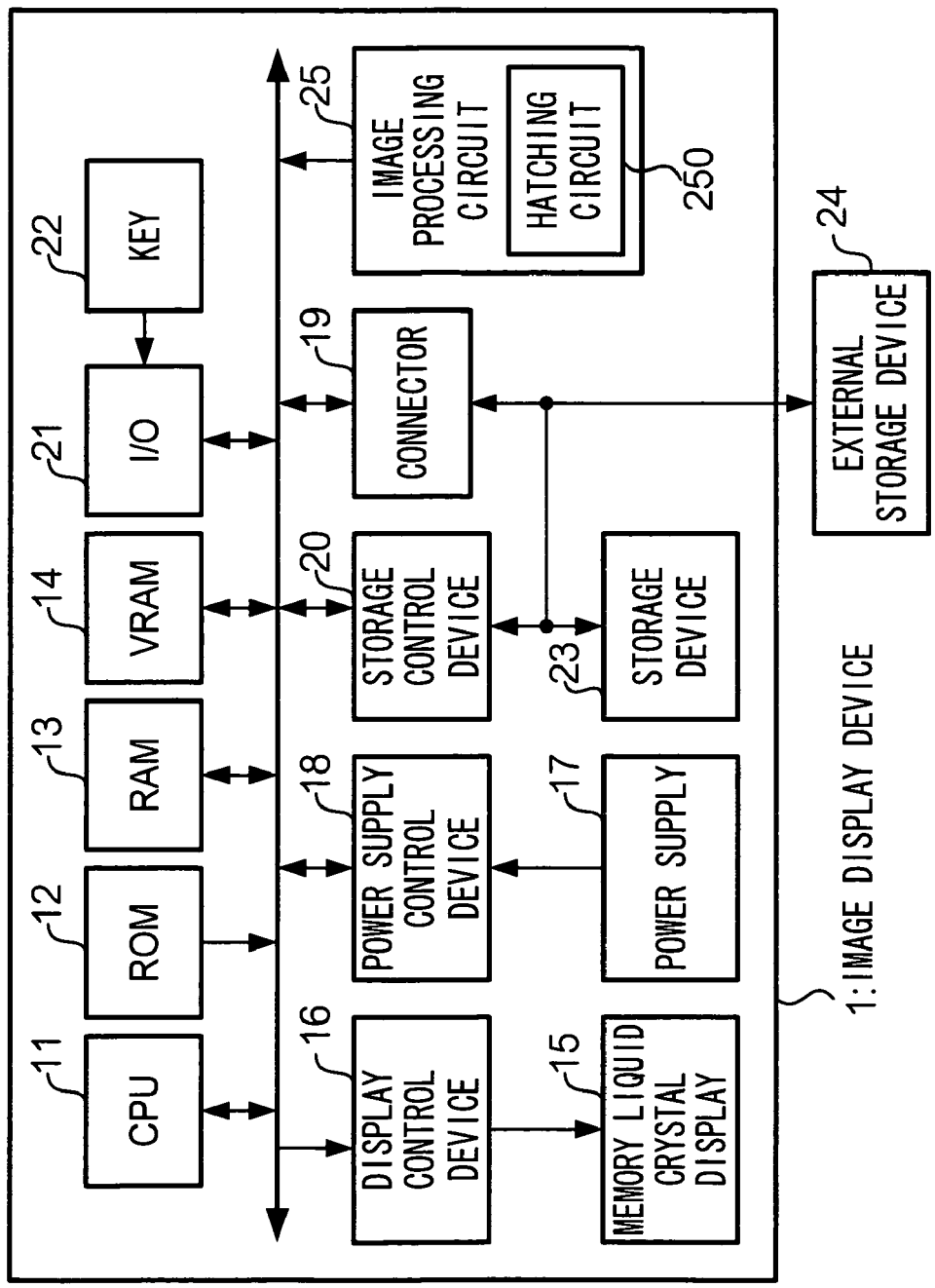
FIG. 1 shows a configuration of an image forming device 1.

FIG. 1 shows a configuration of an image display device 1 according to the first embodiment.

As shown in the figure, the image display device 1 includes a CPU (Central Processing Unit) 11, a ROM (Read Only Memory) 12, a RAM (Random Access Memory) 13, a VRAM (Video Random Access Memory) 14, an image retaining display 15, a display control device 16, a power supply 17, a power supply control device 18, a connector 19, a storage control device 20, an I/O 21, a key 22, a storage device 23, and an image processing circuit 25. Each of these components is connected through an external bus. The CPU 11 reads a control program stored in the ROM 12 and develops the program on the RAM 13. The CPU 11 executes processings in accordance with procedures defined in the control program. The key 22 is a manipulator operated by a user and includes a manipulation device such as a pen device or a joy stick. The I/O 21 monitors a manipulation status of the key 22, and supplies the CPU 11 with a signal corresponding to a manipulation on the key 22 as the user manipulates the key 22. The power supply 17 is, for example, a rechargeable battery, and the power supply control device 18 performs various power supply controls, such as switching on/off of the power supply 17 and monitoring of residual power.

A portable external storage device 24 such as a removable medium is attachable/detachable to/from the connecter 19. The external storage device 24 may be, for example, a card-type storage medium incorporating a flash memory, such as an SD (Secure Digital) card, or may be a disk-type storage medium using a magnetic medium, such as a flexible disk. The storage device 23 is a non-volatile storage medium such as a flash memory or a hard disk, and is included in the image display device 1. The storage device 23 or the external storage device 24 stores image data expressing text (letters), graphics (shapes), and images (photographs). The image data is binary data including pixel values "0" and "1" which respectively indicate white and black. An area which is given the pixel value "1" is a specified area in an image where an image is drawn. An area which is given the pixel value "0" is an unspecified area (i.e., a background area). The storage control device 20 reads image data from the storage device 23 or the external storage device 24 and supplies the image data for the image processing circuit 25 through the external bus, in accordance with instructions from the CPU 11.

The image processing circuit 25 has a hatching circuit 250. The hatching circuit 250 performs hatching on image data supplied in accordance with an instruction from the CPU 11. Further, the hatching circuit 250 outputs the image data subjected to hatching to the VRAM 14. The VRAM 14 is a frame buffer and stores a part of image data which is equivalent to one page to be displayed on the image retaining display 15. The image retaining display 15 is a display unit which includes cholesteric liquid crystals or electrophoresis. The image retaining display 15 has an ability to maintain a displayed image even after supply of electric power stops. The part of image data stored in the VRAM 14 is supplied to the display control device 16 under an instruction from the CPU 11. The display control device 16 controls the image retaining display 15 to show an image based on the supplied part of image data.

Figure 2:
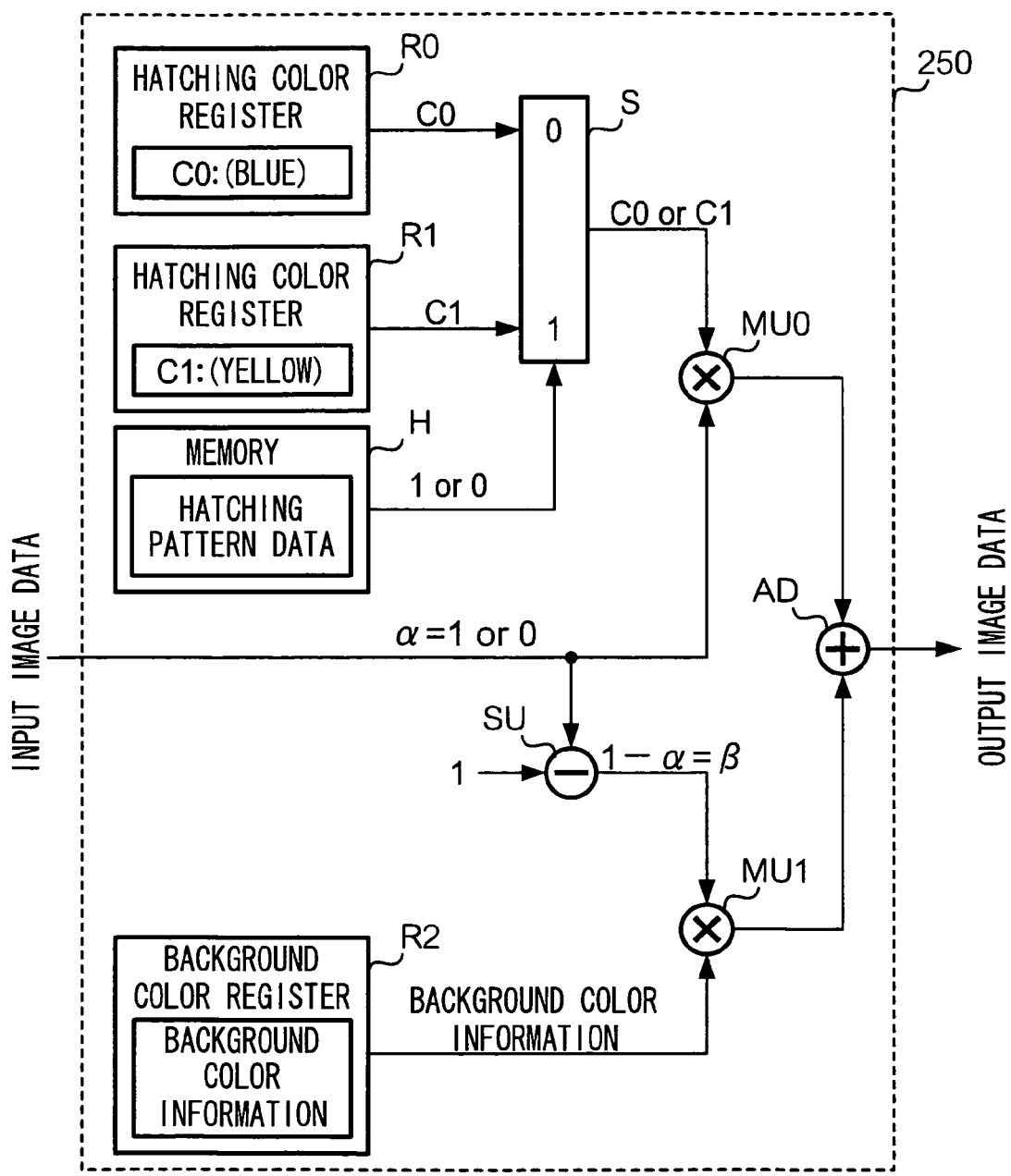
FIG. 2 shows a configuration of a hatching circuit 250.

FIG. 2 shows a configuration of the hatching circuit 250. As shown in the figure, the hatching circuit 250 has a memory H, hatching color registers R0 and R1, a background color register R2, a selector S, multipliers MU0 and MU1, a subtracter SU, and an adder AD. The hatching circuit 250 is input with binary image data, as input image data, which is read from the storage device 23 or the external storage device 24. In the input image data, a pixel value "0" indicates the lowest density (white), and a pixel value "1" indicates the highest density (black). Further, a result of performing a hatching processing by the hatching circuit 250 on the input image data is output as output image data. The memory H stores, as hatching pattern data, positions of respective pixels constituting a hatching pattern (for each of the plural shape-images) which is used to carry out a hatching processing.

Figure 3:
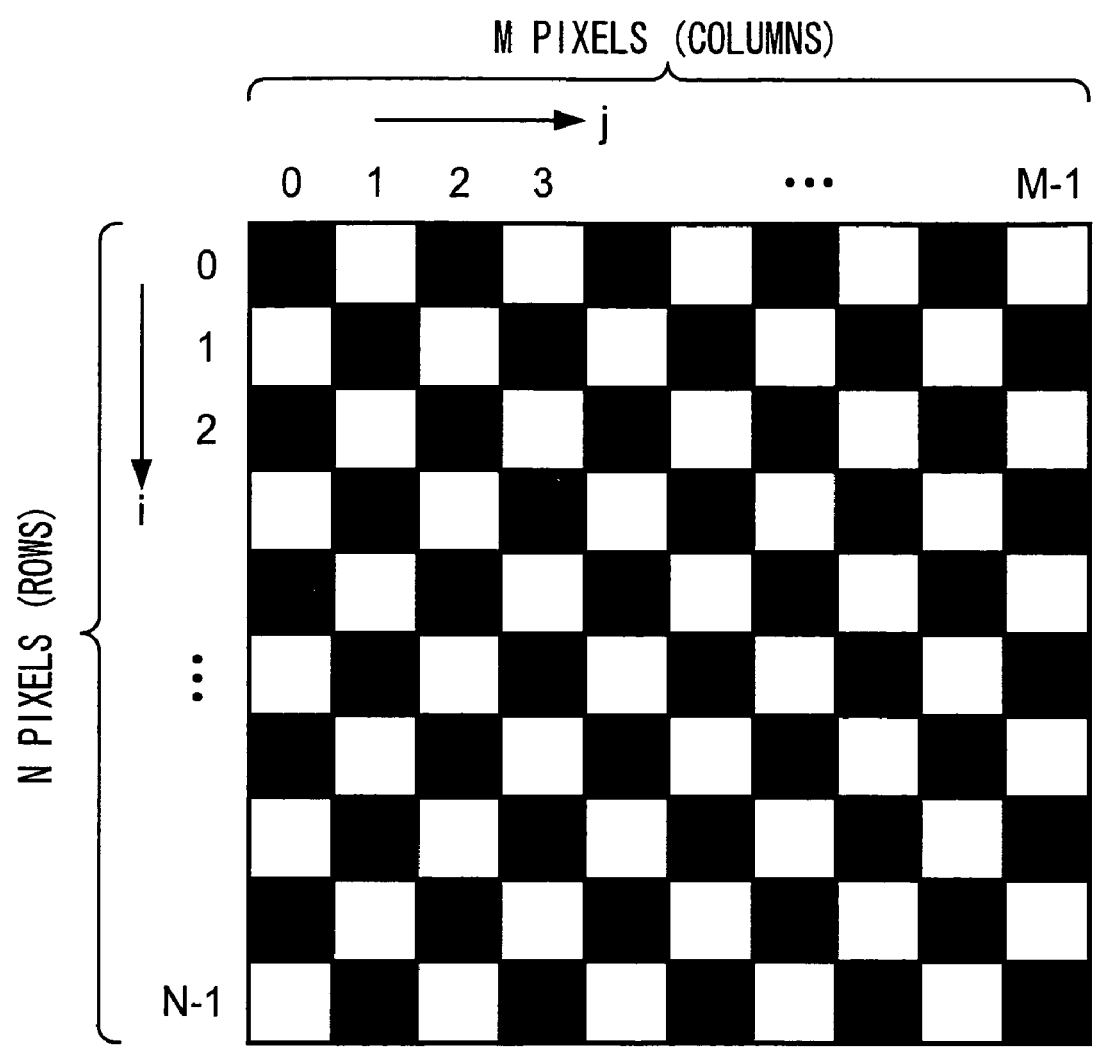
FIG. 3 shows hatching pattern data for performing a hatching of a vertically striped pattern.

FIG. 3 schematically shows hatching pattern data for performing hatching of a vertically-striped pattern. This hatching pattern data expresses each of the plural shape-images by using binary pattern bit values "0" and "1". In FIG. 3, a pattern bit value "0" is provided at each of the positions of pixels forming white grid blocks, and a pattern bit value "1" is provided at each of the positions of pixels forming black grid blocks. The size of the entire hatching pattern is the same as the size of an image equivalent to one page which is maintained on the VRAM 14. Each of the blocks B0 and B1 is including plural pixels (for example, 16×16=256 pixels). To simplify descriptions, however, each block is supposed to be including one pixel. On this supposition, the whole length of the hatching pattern in lateral directions corresponds to the number M of pixels (or columns) arrayed in horizontal directions of an image equivalent to one page, in the VRAM 14. The whole length of the hatching pattern in vertical directions corresponds to the number N of pixels (rows) arrayed in vertical directions of an image equivalent to one page, in the VRAM 14.

In the description made below, position coordinates of a pixel positioned at the upper left corner of hatching pattern data are set to (0, 0). Position coordinates of a pixel defined by a row (i) in a downward direction and a column (j) in a rightward direction from the pixel (0, 0) are expressed as (i,j). Accordingly, for example, a first pixel in the rightward direction from the pixel at the position coordinates (0, 0) is a pixel at position coordinates (0, 1), and a second pixel in the downward direction from the pixel at the position coordinates (0, 0) is a pixel at position coordinates (2, 0). Such a method of expressing position coordinates of pixels is not limited to the hatching pattern data shown in FIG. 3 but also applies to input image data (e.g., shown in FIG. 4 later) input to the hatching circuit 250, and to output image data (e.g., shown in FIG. 8 later) output from the hatching circuit 250.

The following descriptions will be provided again with relation to FIG. 2. The hatching color register R0 stores color information expressing a color of each pixel at the position of the pattern bit value "0" in hatching pattern data. In this case, color information C0 expressing blue is supposed to be stored. The hatching color register R1 stores color information expressing a color of each pixel at the position having the pattern bit value "1" in the hatching pattern data. The color information includes information which specifies a color, and a gradation value of the color. However, in the first embodiment, only two values are supposed as gradation values included in the color information, and the two values respectively indicate presence and absence of a color expressed by the color information. With only the color information C0, "blue" is meant, and at the same time, presence of a blue pixel is meant. With the color information C1, "yellow" is meant, and at the same time, presence of a yellow pixel is meant.

The selector S is input with the color information C0 stored in the hatching color register R0 and with the color information C1 stored in the hatching color register R1. The selector S is sequentially input with pattern bit values included in the hatching pattern data stored in the memory H, as a selection signal, in accordance with an order of position coordinates of pixels as described above. The selector S selects and outputs color information C0 during a period in which the pattern bit value "0" is input as the selection signal. During a period in which the pattern bit value "1" is input as the selection signal, the selector S selects and outputs the color information C1.

The memory H described above functions as a first storage unit which stores positions of respective pixels constituting a hatching pattern. The hatching color registers R0 and R1 each function as a second storage unit which stores color information indicating colors of the hatching pattern, as pixel values of respective pixels constituting the hatching pattern. Further, the selector S functions as a color information output unit which outputs color information stored in the hatching color registers R0 and R1, as pixel values of pixels at respective positions, which are stored in the memory H. In brief, the memory H, hatching color register R0 and R1, and selector S operate in cooperation with each other, to function as a storage unit which stores positions of respective pixels constituting a hatching pattern, and pixel values of the respective pixels.

The multiplier MU0 is a first multiplication unit, and multiplies color information C0 or C1 output from the selector S by the pixel value "0" (white) or "1" (black) included in input image data, for each corresponding pixel position. The description "corresponding pixel position", indicates identical position coordinates of pixels to those of pixels shown in FIG. 3. That is, the multiplier MU0 is input with "C0" or "C1" and "α" and outputs "α×C0" or "α×C1".

The subtracter SU is input with the value α at each position which is included in the input image data, and a value "1". The subtracter SU subtracts α from the value "1", and outputs obtained "1−α" as "β". Accordingly, if α=1, the subtracter SU inverts "1", and outputs "0". If α=0, the subtracter SU inverts "0", and outputs "1". That is, the subtracter SU functions as an inversion unit (or subtraction value output unit) which inverts pixel values expressed as binary values.

The background color register R2 stores color information indicating a color of an unspecified area when an image expressed by input image data is displayed on the image retaining display 15 (i.e., the color information indicates a color of a background area which forms a background behind an image based on the input image data). The color information expresses, for example, white. The image processing circuit 25 is configured so as to draw an image expressed by the input image data, overlapped on a background area of a predetermined color. Therefore, the background color register R2 stores color information of the background area. Hereinafter, the color information described above will be referred to as "background color information".

The multiplier MU1 is a second multiplication unit, and multiplies "β" output from the subtracter SU by background color information supplied from the background color register R2, for each corresponding pixel position. That is, "β×background color information" is output as color information from the multiplier MU1.

The adder AD adds up "α×C0" or "α×C1" output from the multiplier MU0 and "β×background color information" output from the multiplier MU1, for each corresponding pixel position. The adder AD outputs an addition result as output image data. That is, the adder AD outputs color information "α×C0+β×background color information" or "α×C1+β×background color information", as color information included in output image data.

1-2. Operation

Next, an operation of the hatching circuit 250 will be specifically described.

Figure 4:
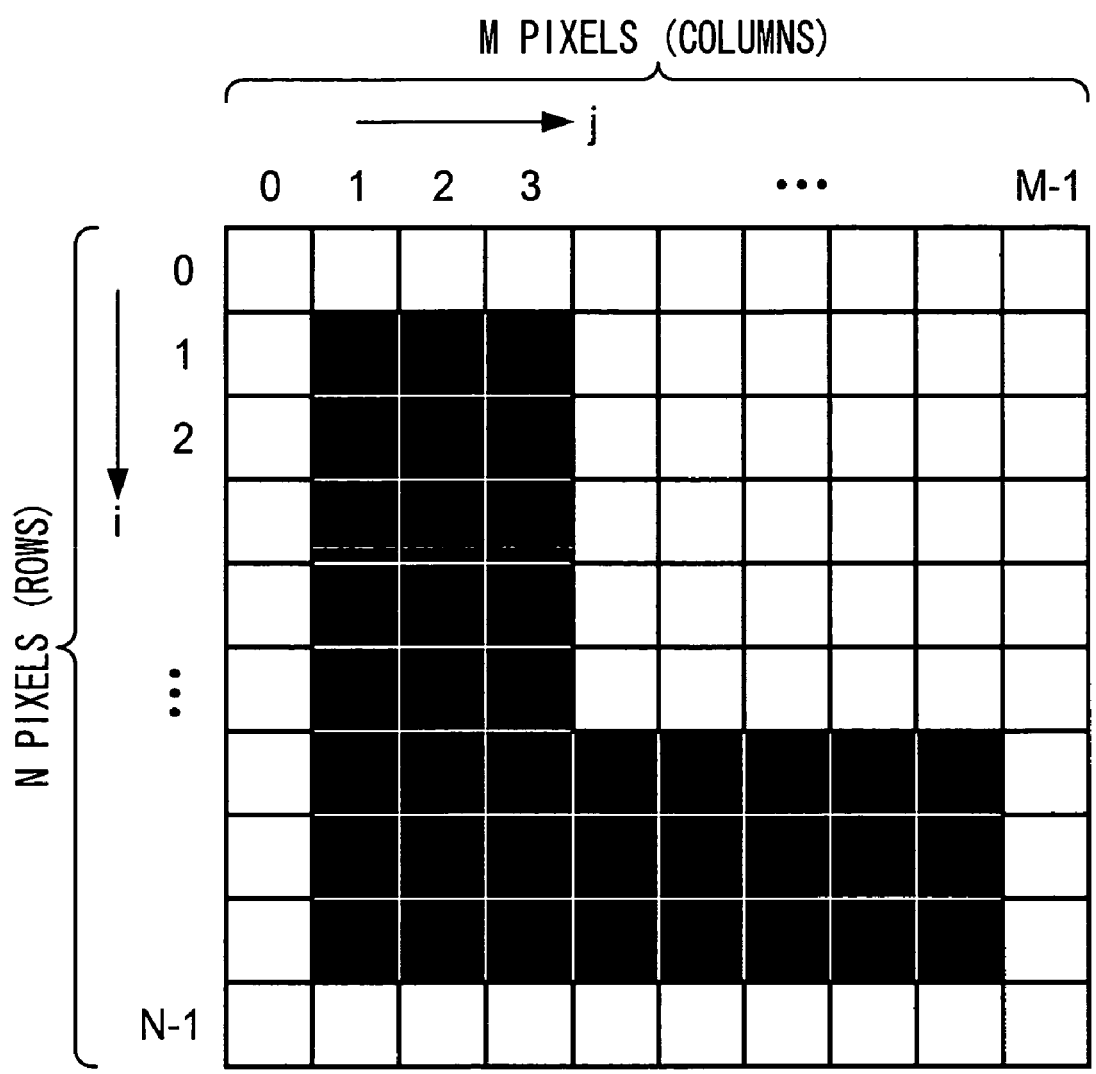
FIG. 4 shows an example of an image expressed by input image data.

FIG. 4 shows an image expressing a letter "L", as an example of an image expressed by input image data which is input to the hatching circuit 250. This image is including M pixels (or columns) arrayed in horizontal directions×N pixels (or rows) arrayed in vertical directions, like the hatching pattern shown in FIG. 3. Pixel values of respective pixels are "0" for a white part in the figure and "1" for a black part. Areas where pixel values are "1" respectively form drawn areas where a text image of "L" is drawn. Areas where pixel values are "0" respectively form non-drawn areas where the text image is not drawn. Descriptions made below exemplify an operation in a case where such input image data is input to the hatching circuit 250.

Figure 5:
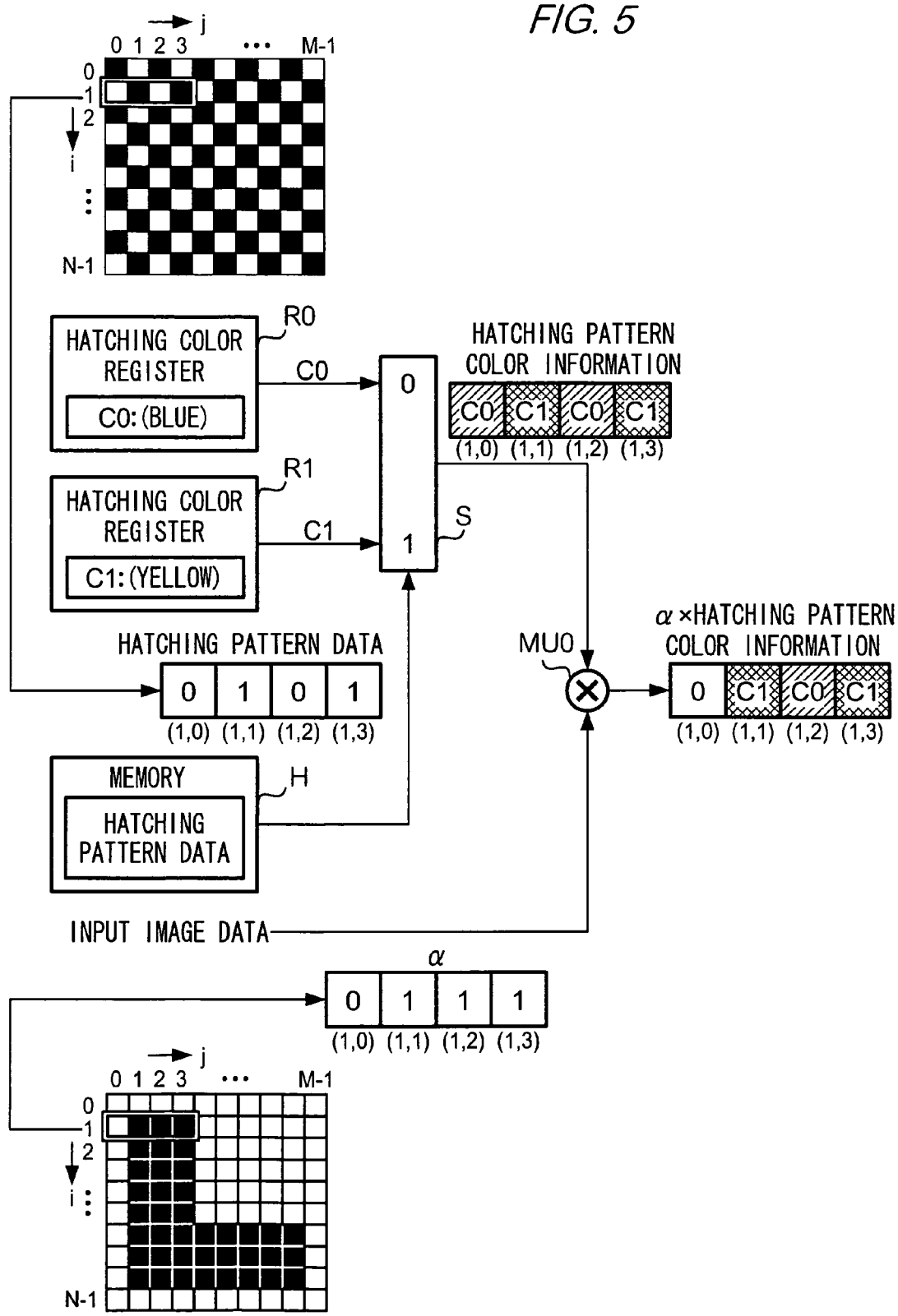
FIG. 5 illustrates operations of a selector S and a multiplier MU0.

At first, operations of the selector S and the multiplier MU0 will be described with reference to FIG. 5. Pixel values of input image data shown in FIG. 4 are input as α to the hatching circuit 250 in accordance with the order of position coordinates. For example, the pixel value of a pixel at position coordinates (0, 0) in input image data is "0", and this value "0" is input first as α. Next, a value "0" is also input as α since the pixel value of a pixel at position coordinates (0, 1) in the input image data is "0", too. Similarly, pixel values on an uppermost row of the input image data shown in FIG. 4 are further sequentially input as α to the hatching circuit 250 in an order of position coordinates (0, 2), (0, 3), . . . , to (0, M−1). Next, pixel values at position coordinates (1, 0), (1, 1), (1, 2), . . . , (1, M−1) on the second uppermost row are sequentially input as α to the hatching circuit 250. Pixel values of pixels at position coordinates (0, 0), (0, 1), (0, 2), and (0, 3) are "0", "1", "1", and "1". FIG. 5 exemplifies a state of sequentially inputting these pixel values.

In parallel with input operations as described above, the selector S is input with color information C0 read from the hatching color register R0, and color information C1 read from the hatching color register R1, as input signals. The selector S is also input with hatching pattern data read from the memory H, as a selection signal. During a period in which "0" is input as a selection signal, the selector S selects and outputs the color information C0. During a period in which "1" is input as a selection signal, the selector S selects and outputs the color information C1. For example, if the hatching pattern data as shown in FIG. 3 is stored in the memory H, a pattern bit value "0" is given for the pixel at position coordinates (1, 0) in the hatching pattern data, and the selector S therefore outputs the color information C0 for this pixel. Subsequently, for the pixel at position coordinates (1, 1) in the hatching pattern data, a pattern bit value "1" is given, and the selector S therefore outputs the color information C1. Similarly, for the pixel at position coordinates (1, 2) in the hatching pattern data, a pattern bit value "0" is given, and the selector S outputs the color information C0. Further, for the pixel at position coordinates (1, 3) in the hatching pattern data, the pattern bit value "1" is given, and the selector S therefore outputs the color information C1 in the same manner as described above. Output color information is sequentially supplied to the multiplier MU0.

The multiplier MU0 multiplies the pixel value α of each pixel by C0 or C1 supplied from the selector S, for each corresponding pixel position, and outputs "α×C0" or "α×C1". For example, for the pixel at position coordinates (1, 0), α is "0" and the color information is C0, so that the multiplier MU0 outputs a value 0×C0="0". Subsequently, for the pixel at position coordinates (1, 1), α is "1" and the color information is C1, so that the multiplier MU0 outputs 1×C1=C1, i.e., outputs directly the color information C1 supplied from the selector S. Similarly, for the pixel at position coordinates (1, 2), α is "1", and the multiplier MU0 therefore outputs the color information C0 supplied from the selector S. For the pixel at position coordinates (1, 3), α is "1", and the multiplier MU0 therefore outputs the color information C1 supplied from the selector S. In this manner, if a pixel has a pixel value "0" in input image data, as a result of multiplication by the multiplier MU0, i.e., if a pixel is in a non-drawn area where no text image is drawn, the multiplier MU0 outputs a value "0". On the other side, if a pixel has a pixel value "1" in the input image data, i.e., if a pixel is in a non-drawn area where a text image is drawn, the color information of a pattern bit value at a corresponding position in the hatching pattern data is output. "α×C0" or "α×C1", i.e., the color information of "α×hatching pattern color information" which is output from the multiplier MU0 is supplied to the adder AD.

Figure 6:
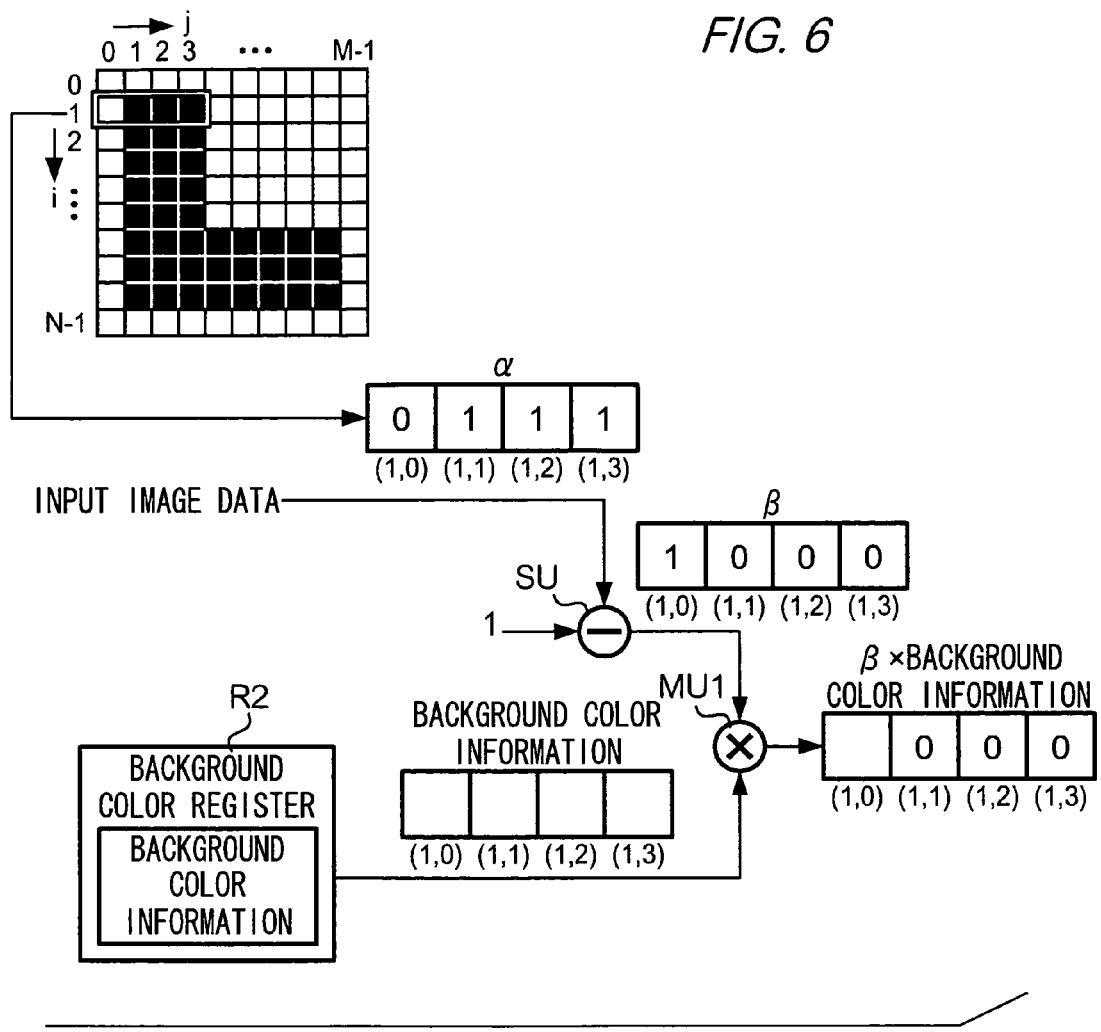
FIG. 6 illustrates operations of a subtracter SU and a multiplier MU1.

Subsequently, operations of the subtracter SU and the multiplier MU1 will be described with reference to FIG. 6. The pixel values α at respective positions which are included in input image data are supplied not only to the multiplier MU0 as described above but also to the subtracter SU. The subtracter SU is input with α and "1", and outputs "1−α" obtained by subtracting α from "1". For example, for the pixel at position coordinates (1, 0), α is "0", and the subtracter SU therefore outputs 1−0=1 as β. Subsequently, for the pixel at position coordinates (1, 1), α is "1", and the subtracter SU therefore outputs 1−1=0 as β. Similarly, for the pixel at position coordinates (1, 2), α is "1", and the subtracter SU therefore outputs a value 1−1=0 as β. For the pixel at position coordinates (1, 3), α is 1, and the subtracter SU therefore outputs a value 1−1=0 as β. β which is output from the subtracter SU is supplied to the multiplier MU1.

The multiplier MU1 is supplied with β from the subtracter SU and is also supplied with background color information from the background color register R2. The multiplier MU1 outputs "β×background color information" obtained by multiplying β by the background color information, for each corresponding pixel position. That is, if a pixel has a pixel value "0" in input image data, i.e., if a pixel is in an unspecified area on which no text image is drawn, β is "1" for the pixel, and the multiplier MU1 directly outputs the background color information. Otherwise, if a pixel has a pixel value "1" in the input image data, i.e., if a pixel is in an unspecified area on which a text image is drawn, β is "0" for the pixel, and the multiplier MU1 therefore outputs the value "0". For example, for a pixel at position coordinates (1, 0), β supplied from the subtracter SU is "1", and the multiplier MU1 therefore outputs directly the background color information supplied from the background color register R2. Subsequently, for each of the pixels at position coordinates (1, 1), (1, 2), and (1, 3), β supplied from the subtracter SU is "0", and the multiplier MU1 therefore outputs a value "0". "β×background color information" which is output from the multiplier MU1 is supplied to the adder AD.

Figure 7:
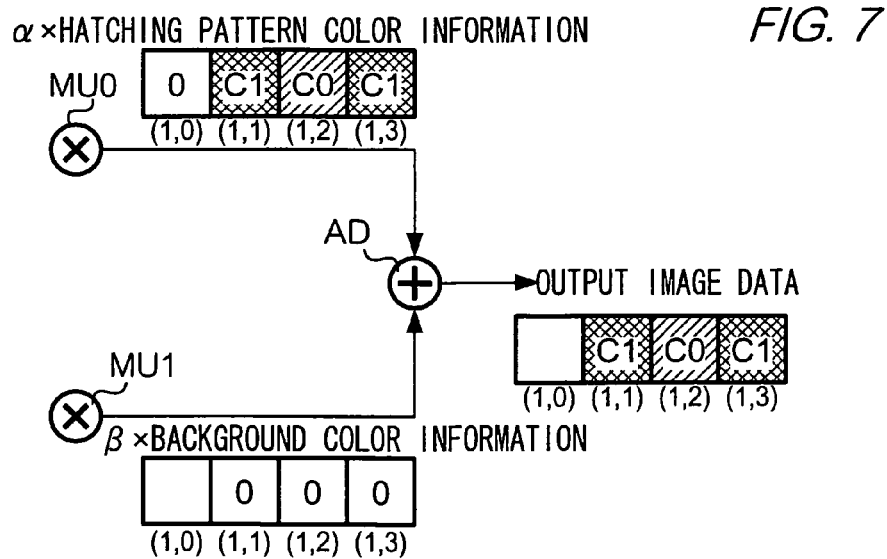
FIG. 7 illustrates an operation of an adder AD.

Next, an operation of the adder AD will be described with reference to FIG. 7. The adder AD outputs a value "α×hatching pattern color information+β×background color information" which is obtained by adding "α×hatching pattern color information" supplied from the multiplier MU0 to "β×background color information" supplied from the multiplier MU1, for each corresponding pixel position. For example, for the pixel at position coordinates (1, 0), the value "α×hatching pattern color information" supplied from the multiplier MU0 is "0", and the value "β×background color information" supplied from the multiplier MU1 is "background color information". Therefore, the adder AD outputs the "background color information". Subsequently, for the pixel at position coordinates (1, 1), the value "α×hatching pattern color information" is C1, and the value "β×background color information" is "0". The adder AD therefore outputs the hatching pattern color information C1. Similarly, for the pixel at position coordinates (1, 2), the value "α×hatching pattern color information" is C0, and the value "β×background color information" is "0". The adder AD therefore outputs the C0. For the pixel at position coordinates (1, 3), the value "α×hatching pattern color information" is C1, and the value "β×background color information" is "0". The adder AD therefore outputs the hatching pattern color information C1. That is, pixel values of pixels in specified areas in an input image as shown in FIG. 4 are substituted with color information of a hatching pattern. On the other hand, pixel values of pixels in unspecified areas are substituted with background color information. Results of such substitution are output as output image data. The output image data which is output from the adder AD is temporarily stored into the VRAM 14, and is thereafter interpreted by the display control device 16. The interpreted output image data is then displayed as an image on the image retaining display 15.

Figure 8:
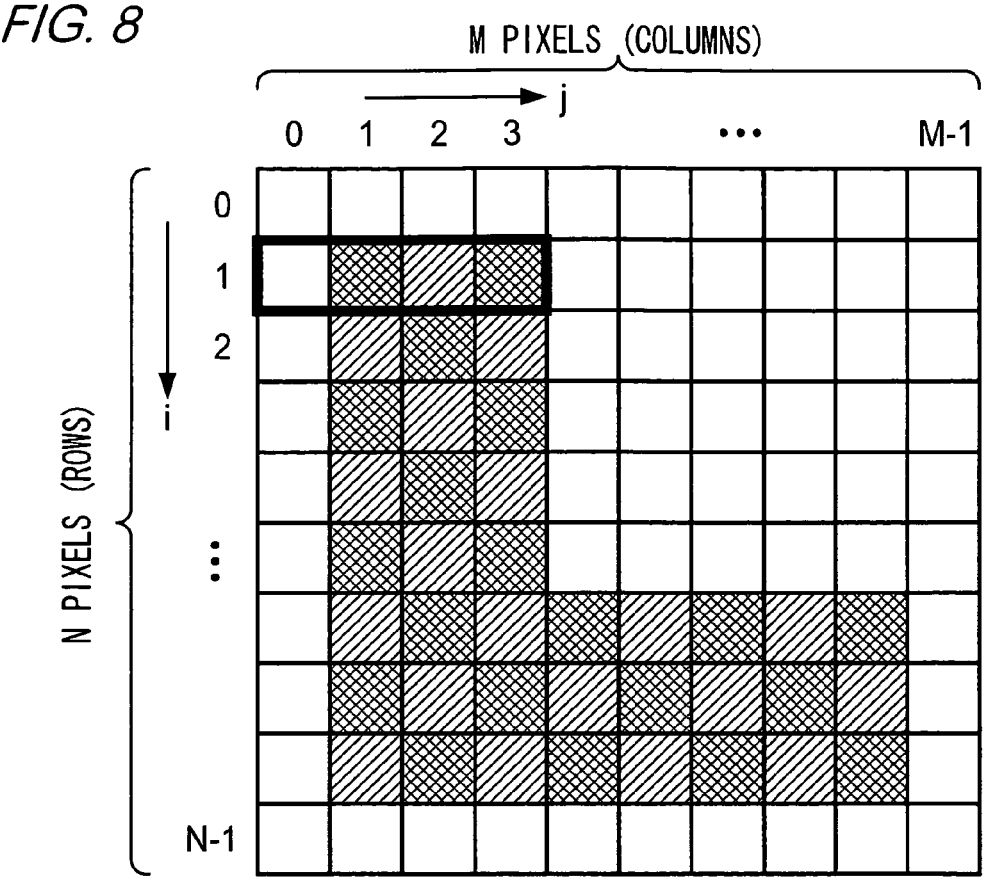
FIG. 8 shows an output image displayed on a memory liquid crystal display 15.

FIG. 8 shows an output image displayed on the image retaining display 15 on the basis of output image data. As shown in the figure, the output image is including a specified area where a text image expressing a letter "L" is drawn, and an unspecified area where no text image is drawn, as in the input image data shown in FIG. 4. However, the specified area of the text image is painted with a grid pattern including blue and yellow grid blocks, corresponding to the hatching pattern shown in FIG. 3. Further, unspecified areas where the text image is not drawn are not hatched, and are painted with a white background image expressed by background color information. For example, the color of a pixel at position coordinates (1, 0) is white as a background color. The color of a pixel at position coordinates (1, 1) is yellow expressed by color information C1 of the hatching pattern. Further, the color of a pixel at position coordinates (1, 2) is blue as expressed by color information C0 of the hatching pattern data. The color of a pixel at position coordinates (1, 3) is yellow expressed by color information C1 of the hatching pattern.

According to the first embodiment described above, only specified areas where letters are drawn in an input image can be hatched by simply using a circuit having a relatively simple configuration which is constituted only of registers, a selector, multipliers, an adder, and a subtracter. Accordingly, it is not necessary to specify every one of the position coordinates or memory addresses of areas as targets to be hatched. Further, hatching of a desired color can be achieved by merely storing desired colors into the hatching color registers R0 and R1.

1-3. Modifications

The first embodiment has been described above, and the content of the first embodiment can be modified as follows. Further, modifications described below may be appropriately combined with each other.

(1) In the above first embodiment, details of a hatching processing has been described referring to an example in which hatching pattern data expressing a hatching pattern of a vertically-striped pattern as shown in FIG. 3 is stored in the memory H, and input image data expressing a letter "L" as shown in FIG. 4 is input. However, the content of the input image and the hatching pattern are not limited to that in the first embodiment.

Figure 9A:
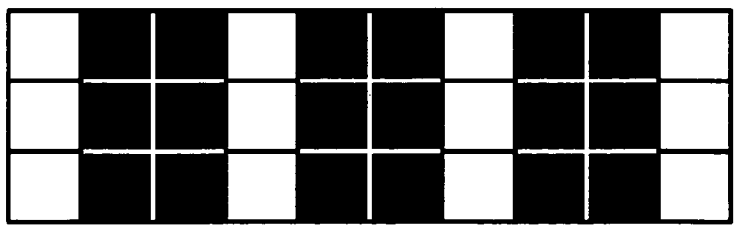
FIGS. 9A, 9B, and 9C respectively show a hatching pattern, an input image, and an output image, according to a modification.
Figure 9B:
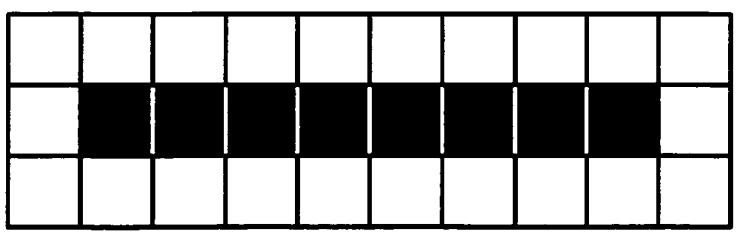
Figure 9C:
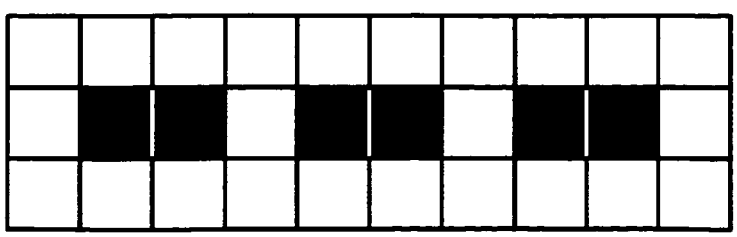

For example, there may be supposed that the memory H stores hatching pattern data expressing a hatching pattern as shown in FIG. 9A and input image data expressing a line as shown in FIG. 9B is input. In this case, a hatching processing is performed only on an area where the line is drawn. Therefore, the hatching circuit 250 outputs output image data expressing an output image as shown in FIG. 9C. At this time, the line input as an input image can be replaced with a broken line having the same color, if the same color information as the background color is stored in the hatching color register R0 and if the same color information as that of the line as the input image is stored in the hatching color register R1, various broken lines such as a one-dot chain line and a two-dot chain line can be generated.

(2) In the first embodiment, gradation values of color information are supposed to be two values which respectively indicate presence and absence of a color indicated by the color information. Therefore, color information of a hatching pattern directly means a color itself, and also presence of the color. However, if the memory liquid crystal display 15 is capable of expressing one color in three or more gradations, the color information includes information which specifies directly a color, and also a gradation value of the color.

(3) In the first embodiment, the inversion unit that inverts binary input image data is including the subtracter SU. However, the inversion unit is not limited to the subtracter SU but may be configured so as to, for example, regard binary input image data as a selection signal, and so as to select and output an input signal "0" when the selection signal "1" is input or select and output an input signal "1" when a selection signal "0" is input.

The input image data need not be including two values of "1" and "0" but may be including two values of "0" and an integer other than "0", such as "0" and "15". In this case, if the multiplier MU0 directly multiplies the integer other than "0" by color information of a hatching pattern, the color information of the hatching pattern is multiplied by the integer. Hence, the color information of the hatching pattern needs to be multiplied beforehand by "1/integer", or the integer needs to be divided by the integer before the integer is input to the multiplier MU0. The input image data needs only to be binary data at a point of time when the input image data is input to the hatching circuit 250 shown in FIG. 2. If an image is originally expressed as multi-valued data, the multi-valued data may be converted first into binary data, which may then be input to the hatching circuit 250.

(4) Areas other than hatching target areas are, in brief, background areas. Background color information stored in the background color register R2 may be used as image data to be displayed in the background areas, as in the first embodiment described above, or input image data which is input to the hatching circuit 250 may be used as the image data to be displayed in the background areas. In the latter case, the circuit configuration of the first embodiment may be arranged so that the multiplier MU1 is supplied with input image data in place of the background color information read from the background color register R2. With such a circuit configuration, the color of the background areas in an output image can be the same as that of the background areas in an input image.

Otherwise, either the background color information stored in the background color register R2 or the input image data input to the hatching circuit 250 may be specified.

Figure 10:
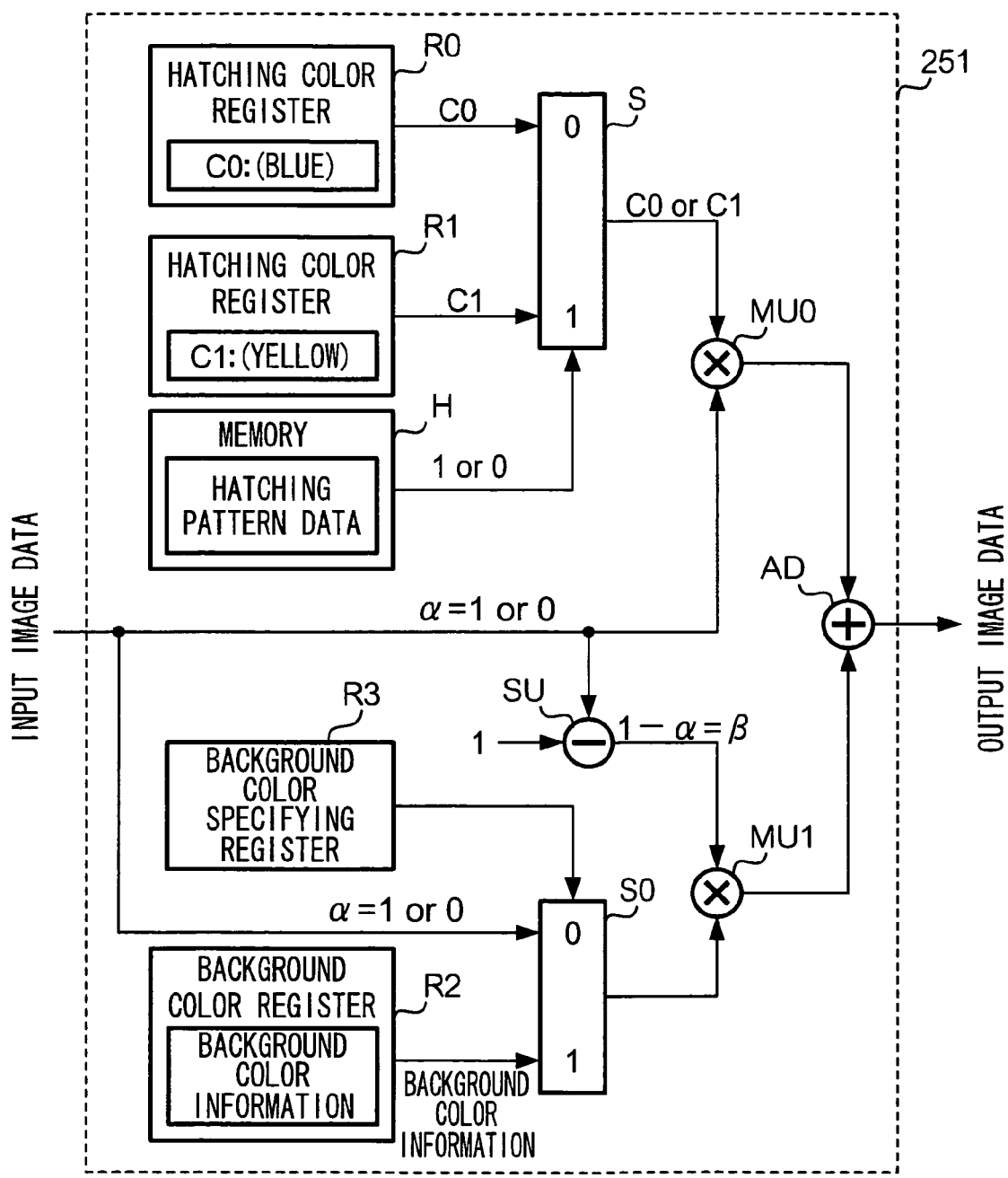
FIG. 10 shows a configuration of a hatching circuit 251 according to a modification.

FIG. 10 shows a configuration of a hatching circuit 251 in this case. The hatching circuit 251 is additionally provided with a background color specifying register R3 and a selector S0. Other features of the configuration are the same as those of the configuration of the hatching circuit 250 shown in FIG. 2. The background color specifying register R3 stores a selection signal for specifying either the pixel value α at each position in input image data or background color information stored in the background color register R2. That is, the background color specifying register R3 functions as a specifying unit that specifies either a pixel value at each pixel position included in binary input image data or a pixel value at each pixel position included in background color information. The selection signal stored in the background color specifying register R3 may be rewritten by the CPU 11, on the basis of a manipulation of key 22 by a user. The selector S0 is input with, as input signals, the pixel value "α" of input image data, and background color information stored in the background color register R2. The selector S0 is input with the selection signal stored in the background color specifying register R3. When a selection signal specifying the pixel value α ("0" in this case) at each position in input image data is input, the selector S0 then selects and outputs the pixel value α in the input image data. On the other hand, when a selection signal specifying background color information ("1" in this case) stored in the background color register R2 is input, the selector S0 selects and outputs the background color information. That is, the selector S0 functions as a supply unit which supplies the multiplier MU1 as a second multiplication unit with the pixel value specified by the background color specifying register R3. Accordingly, a color of unspecified areas in an input image or a background color can be specified as a color of background areas in an output image.

(5) In the first embodiment described above, image data stored in the VRAM 14 is displayed on the memory liquid crystal display 15 by the display control device 16. In this respect, image data subjected to a hatching processing may be used for printing. For example, output image data which is output from the adder AD may be written into the RAM 13, and may further be provided for a printing unit, as image data for an image to be printed on a sheet of paper. The printing unit carries out printing in accordance with the supplied image data, and forms an image expressed by the image data, onto a sheet of paper.

(6) In the above first embodiment, background color information stored in the background color register R2 is directly supplied to the multiplier MU1. If background color information is stored in the VRAM 14 in addition to the background color register R2, the background color information in the VRAM 14 or the register R2 may be selected and supplied to the multiplier MU1.

Figure 11:
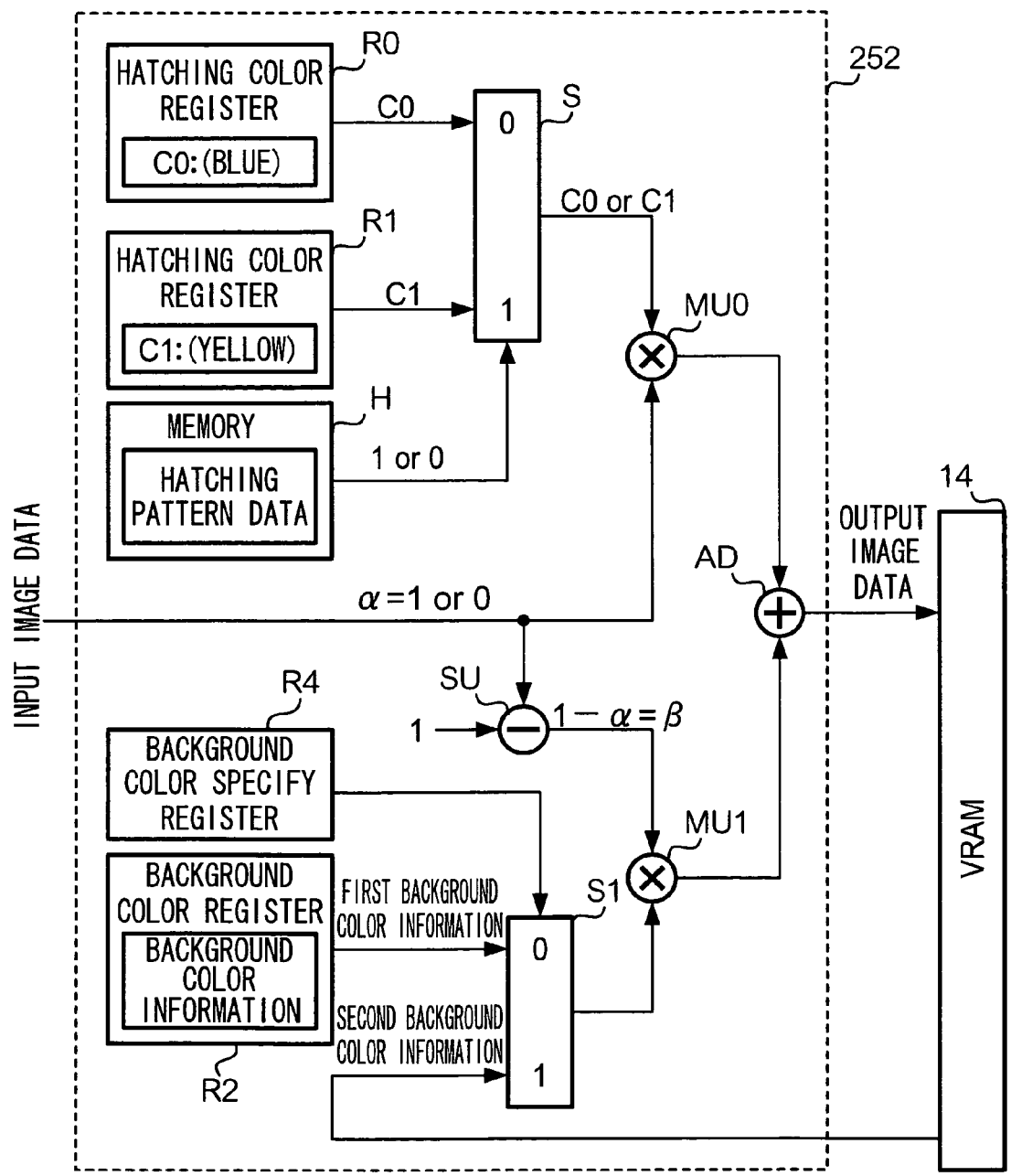
FIG. 11 shows a configuration of a hatching circuit 252 according to another modification.

FIG. 11 shows a configuration of a hatching circuit 252 according to the modification. The hatching circuit 252 is additionally provided with a background color specifying register R4 and a selector S1. The other features of the configuration are the same as those of the configuration of the hatching circuit 250 shown in FIG. 2. The background color specifying register R4 stores a selection signal for specifying either first background color information stored in the background color register R2 or second background color information stored in the VRAM 14. That is, the background color specifying register R4 functions as a specifying unit that specifies either the background color register R2, which stores predetermined first background color information, or the VRAM 14 on which image information to be output to the image retaining display 15 is developed. The selection signal stored in the background color specifying register R4 may be rewritten by the CPU 11, on the basis of a manipulation of key 22 by a user. The selector S1 is input with, as input signals, the first background color information stored in the background color register R2 and the second background color information stored in the VRAM 14. The selector S1 is also input with the selection signal stored in the background color specifying register R4. When a selection signal ("0" in this case) specifying the background color register R2 is input, the selector S1 then selects and outputs the first background color information read from the background color register R2. On the other hand, when a selection signal ("1" in this case) specifying the VRAM 14 is input, the selector S1 then selects the second background color information read from the VRAM 14. That is, the selector S1 functions as a supply unit which reads information stored in a storage specified by the background color specifying register R4, i.e., information stored in the background color register R2 or in the VRAM 14, as a pixel value included in the background color information. The selector S1 as a supply unit supplies the multiplier MU1 as a second multiplication unit with the read information.

If an image is output (or displayed or printed) by a display unit or a printing unit, image information of the output image is developed on a storage unit such as the RAM 13, and is supplied to the display unit or the printing unit after being temporarily stored into the RAM 13. Image information of the output image stored in the RAM 13 may be used as background color information in the first embodiment. In this case, the background color specifying register R4 functions as a specifying unit which specifies either the background color register R2 storing the predetermined first background color information or the RAM 13 storing image information of an output image. Further, the selector S1 functions as a supply unit which reads the background color information or the image information stored in the storage unit specified by the background color specifying register R4 (in brief, the background color register R2 or the RAM 13) as a pixel value of the background color information in the first embodiment. The selector S1 as a supply unit supplies the multiplier MU1 as a second multiplication unit with the read information. Accordingly, a storage unit such as the RAM 13 can be selected as a supply source of background color information.

(7) In the above first embodiment, the hatching circuit 250 is provided in the image processing circuit 25. In this respect, the hatching circuit 250 may alternatively be provided in any other device such as the display control device 16.

(8) The hatching circuit 250 may be used in a personal computer device, a mobile phone, or an electronic book which has a display device for displaying images according to image data.

2. Second Embodiment

Next, a second embodiment of the invention will be described. From the following descriptions, matters common to the first embodiment will be omitted where unnecessary. Components common to the first embodiment will be denoted with common reference symbols.

2-1. Configuration

Figure 12:
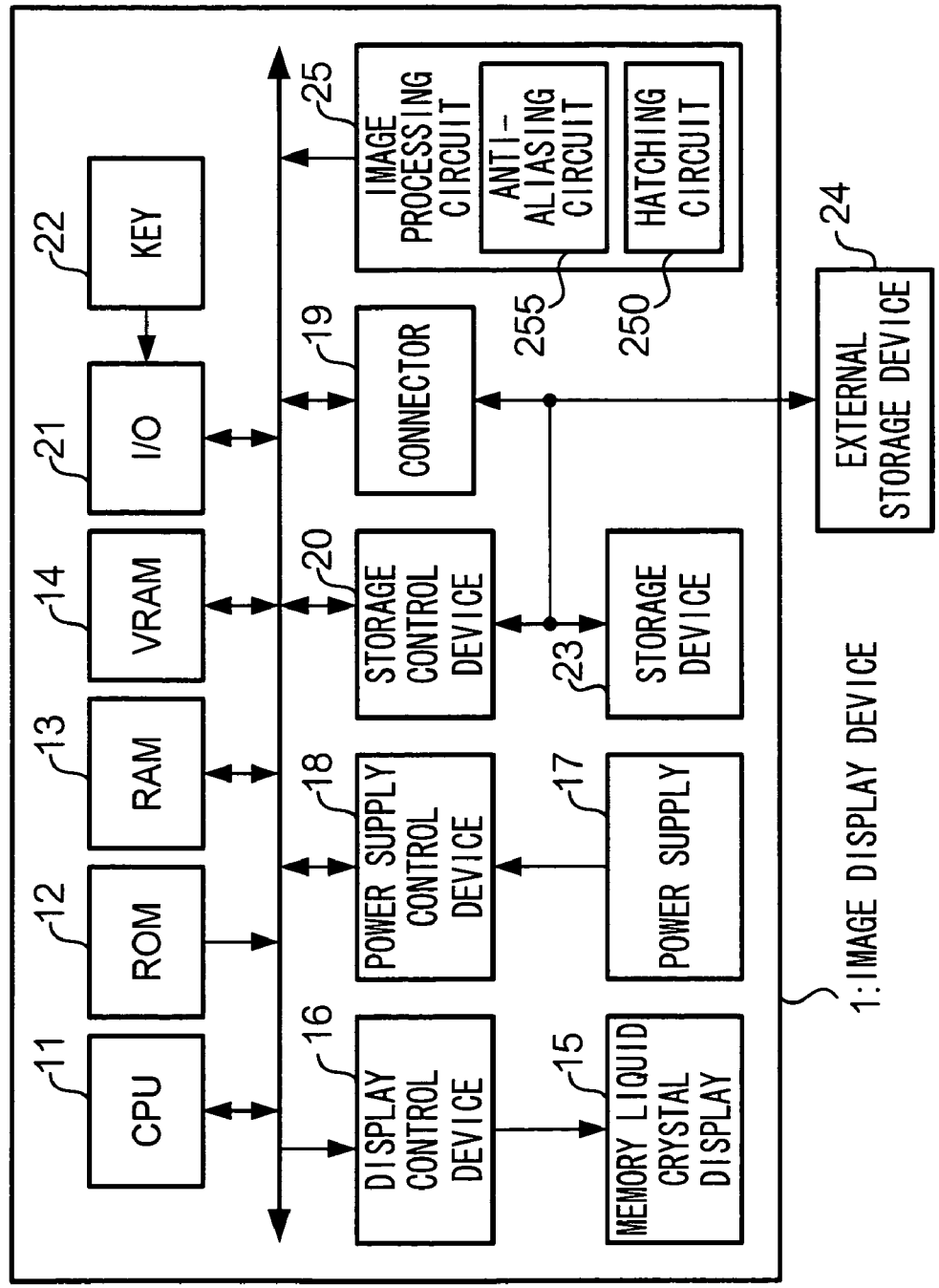
FIG. 12 shows a configuration of another image display device 1.

FIG. 12 shows a configuration of an image display device 1 according to the second embodiment. An image processing circuit 25 has an anti-aliasing circuit 255 and a hatching circuit 250. The anti-aliasing circuit 255 performs an anti-alias processing on image data supplied in accordance with an instruction from the CPU 11. More specifically, the anti-aliasing circuit 255 calculates one pixel value by averaging pixel values of plural pixels included in the supplied image data, e.g., averaging pixel values of total 16 pixels including 4 pixels in a vertical direction×4 pixels in a horizontal direction. The anti-aliasing circuit 255 thereby generates multi-valued image data including pixel values calculated in this manner. The image data generated in this manner can include pixel values of intermediate gradations expressing gray colors. For example, if the anti-alias processing is performed on image data expressing a letter by white and black pixels, contours of the letter are compensated for by a gray color of an intermediate gradation.

In the second embodiment, the hatching circuit 250 has a memory H, hatching color registers R0 and R1, a background color register R2, a selector S, multipliers MU0 and MU1, a subtracter SU, and an adder AD (see FIG. 2). The hatching circuit 250 is input with multi-valued image data including an intermediate gradation value, as input image data. The multi-valued image data is obtained in a manner that an anti-aliasing circuit 255 performs an anti-alias processing on binary image data read from a storage device 23 or an external storage device 24. Pixel values included in the input image data are expressed in a manner that pixel values ranging from a pixel value indicating a pixel having the lowest density to a pixel value indicating a pixel having the highest density are expressed between "0" to "1". In the following descriptions, pixel values included in input image data will be referred to as $\alpha$.

In case where multi-valued image data which is output from the anti-aliasing circuit 255 is expressed by pixel values "0" to "1", pixel values of the multi-valued image data are input directly as $\alpha$ to the hatching circuit 250. In this case, the pixel value $\alpha=0$ expresses white (the lowest density). The pixel value $\alpha=1$ expresses black (the highest density). $\alpha$ which satisfies $0<\alpha<1$ expresses gray. On the other hand, multi-valued image data output from the anti-aliasing circuit 255 is expressed by pixel values which are integers greater than "0" to "1" (e.g., "0" to "5"), the pixel values of the multi-valued image data need to be converted into values which fall within a range of "0" to "1" before inputting the pixel values as $\alpha$ to the hatching circuit 250.

A method for converting pixel values of the multi-valued image data into pixel values $\alpha$ will now be described below. Conversion of input image data into pixel values $\alpha$ is performed by dividing each of the pixel values included in multi-valued image data by a maximum pixel value of the multi-valued image data. For example, in case where multi-valued image data is expressed by 16 gradations of "0" to "15" (where "0" indicates white and "15" indicates black), a pixel value "0" included in the multi-valued image data is converted into 0/15="0" as $\alpha$, which is obtained by dividing the pixel value "0" by the maximum pixel value "15". Similarly, another pixel value "10" as an intermediate gradation value included in the input image data is converted into 10/15≈"0.67" as $\alpha$, which is obtained by dividing the pixel value "10" by the maximum pixel value "15".

Further, a result of performing a hatching processing on the input image data by the hatching circuit 250 is output as output image data. The memory H stores, as hatching pattern data, positions of respective pixels constituting a hatching pattern (for each of the plural shape-images) which is used to carry out the hatching processing.

The subtracter SU is input with the value α at each position which is included in the input image data, and a value "1". The subtracter SU subtracts α from the value "1", and outputs obtained "1−α" as β. Accordingly, if α=1, the subtracter SU subtracts the pixel value "1" from "1" as a maximum pixel value of input image data, to obtain a pixel value 1−1="0", and outputs the obtained pixel value "0". If α=0, the subtracter SU subtracts the pixel value "0" from the maximum pixel value "1", to obtain a pixel value 1−0="1", and outputs the pixel value "1". Similarly, if α=0.67, the subtracter SU subtracts the pixel value "0.67" from the maximum pixel value "1" of the input image data, to obtain a pixel value 1−0.67="0.33", and outputs the obtained pixel value "0.33". That is, the subtracter SU functions as a subtraction value output unit which outputs a value obtained by subtracting a pixel value at each position included in input image data, from the maximum pixel value of the input image data. In this manner, when a pixel value included in the input image data indicates a high density, the subtracter SU outputs a pixel value indicating a low density. When a pixel value included in the input image data indicates a low density, the subtracter SU outputs a pixel value indicating a high density.

2-2. Operation

Figure 13:
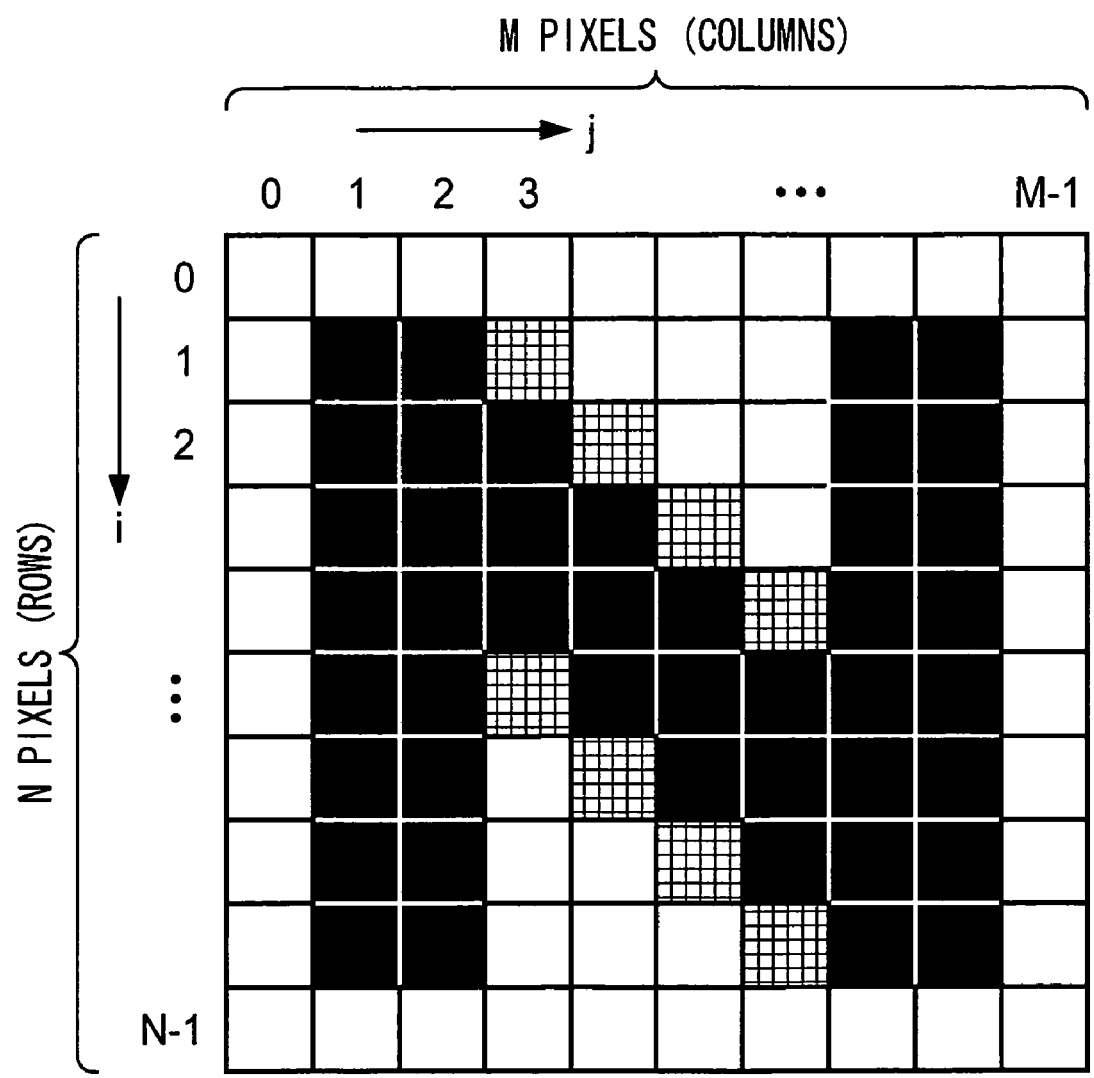
FIG. 13 shows an example of an image expressed by input image data.

FIG. 13 shows an image expressing a letter "N", as an example of an image expressed by input image data which is input to the hatching circuit 250. This image is including M pixels (or columns) arrayed in horizontal directions×N pixels (or rows) arrayed in vertical directions, as in the hatching pattern shown in FIG. 3. Pixel values of respective pixels are "0" for white parts in the figure, "1" for black parts, and "0.67" for parts of an intermediate gradation. Areas where pixel values are "1" respectively form specified areas where a text image of "N" is drawn. Areas where the pixel value α is "0" respectively form unspecified areas where the text image is not drawn. Descriptions made below exemplify an operation in a case where such input image data is input to the hatching circuit 250.

Figure 14:
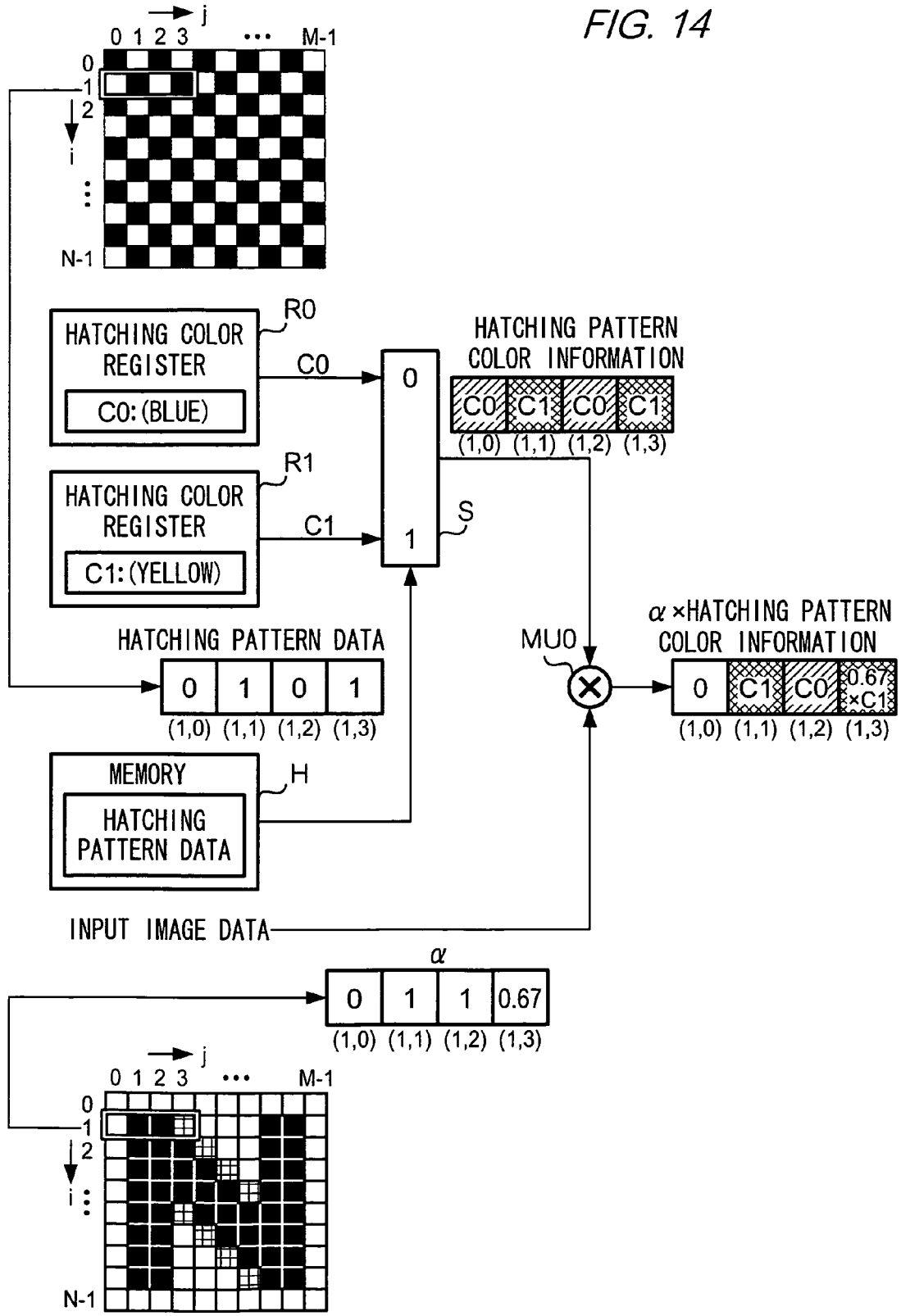
FIG. 14 illustrates operations of a selector S and a multiplier MU0.

At first, operations of the selector S and the multiplier MU0 will be described with reference to FIG. 14. Pixel values of input image data shown in FIG. 13 are input as α to the hatching circuit 250 in accordance with the order of position coordinates. For example, the pixel value α of a pixel at position coordinates (0, 0) in input image data is "0", and this value "0" is input first. Next, the pixel value α of a pixel at position coordinates (0, 1) in the input image data is "0", too, and this value "0" is input. Similarly, pixel values α on an uppermost row of the input image data shown in FIG. 13 are further sequentially input to the hatching circuit 250 in an order of position coordinates (0, 2), (0, 3), ... , to (0, M−1). After pixel values of pixels on one row are all input in this manner, pixel values α at position coordinates (1, 0), (1, 1), (1, 2), ..., (1, M−1) on the second uppermost row are sequentially input to the hatching circuit 250. At this time, pixel values of pixels at position coordinates (1, 0), (1, 1), (1, 2), and (1, 3) are respectively "0", "1", "1", and "0.67". FIG. 14 shows an example of a state where these pixel values are sequentially input.

In parallel with input operations as described above, the selector S is input with color information C0 read from the hatching color register R0, and color information C1 read from the hatching color register R1, as input signals. The selector S is also input with hatching pattern data read from the memory H, as a selection signal. During a period in which "0" is input as a selection signal, the selector S selects and outputs the color information C0. During a period in which "1" is input as a selection signal, the selector S selects and outputs the color information C1. For example, if the hatching pattern data as shown in FIG. 3 is stored in the memory H, a pattern bit value "0" is given for the pixel at position coordinates (1, 0) in the hatching pattern data, and the selector S therefore outputs the color information C0 for this pixel. Subsequently, for the pixel at position coordinates (1, 1) in the hatching pattern data, a pattern bit value "1" is given, and the selector S therefore outputs the color information C1. Similarly, for the pixel at position coordinates (1, 2) in the hatching pattern data, a pattern bit value "0" is given, and the selector S outputs the color information C0. Further, for the pixel at position coordinates (1, 3) in the hatching pattern data, the pattern bit value "1" is given, and the selector S therefore outputs the color information C1 in the same manner as described above. Output color information is sequentially supplied to the multiplier MU0.

The multiplier MU0 multiplies the pixel value α at each position which is included in the input image data by color information C0 or C1 supplied from the selector S, for each corresponding pixel position, and outputs "α×C0" or "α×C1". For example, for the pixel at position coordinates (1, 0), α is 0 and the color information is "C0". The multiplier MU0 therefore outputs a value 0×C0="0". Subsequently, for the pixel at position coordinates (1, 1), α is "1" and the color information is C1. The multiplier MU0 therefore outputs 1×C1=C1, i.e., outputs directly the color information C1 supplied from the selector S. Similarly, for the pixel at position coordinates (1, 2), α is "1", and the multiplier MU0 therefore outputs the color information C0 supplied from the selector S. For the pixel at position coordinates (1, 3), α supplied from the selector S is "0.67" and the color information is C1. Therefore, the multiplier MU0 outputs "0.67×C1", i.e., color information indicating a color having a density which is 0.67 times the density expressed by the color information C1. In this manner, if a pixel value α of a pixel in input image data is "0" as a result of multiplication by the multiplier MU0, i.e., if a pixel is in an unspecified area where no text image is drawn, the multiplier MU0 outputs a value "0" for the pixel. On the other hand, if the pixel value α of a pixel in the input image data is "1", i.e., if a pixel is in an unspecified area where a text image is drawn, the multiplier MU0 outputs directly the color information of a pattern bit value at a corresponding position in hatching pattern data, for the pixel. Otherwise, if a pixel value α of a pixel in the input image data has an intermediate gradation value such as "0.67", the multiplier MU0 outputs color information indicating a color having a density which is obtained by multiplying a density of a color expressed by color information of a pattern bit value at a corresponding position in the hatching pattern data by a density expressed by the pixel value α in input image data. "α×C0" or "α×C1", i.e., the color information of "α×hatching pattern color information" which is output from the multiplier MU0 is supplied to the adder AD.

Figure 15:
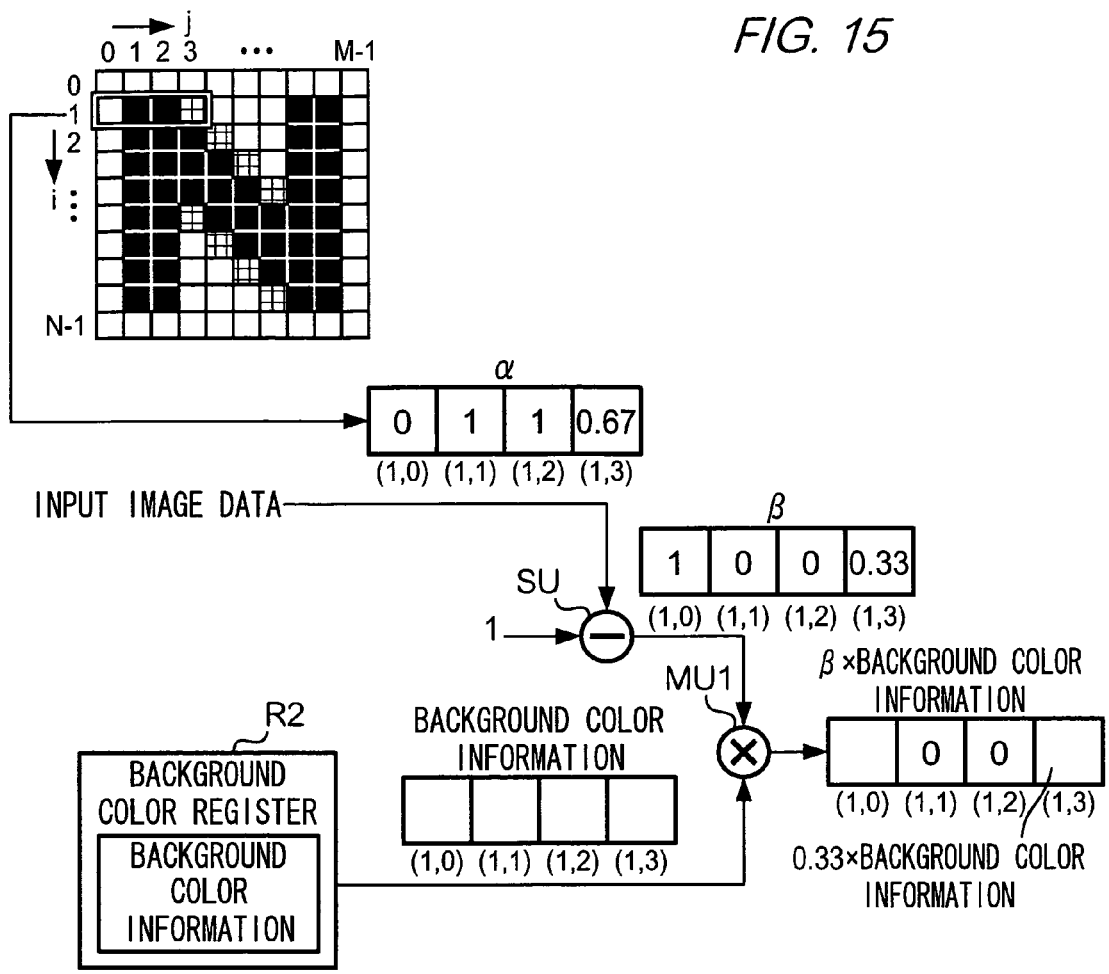
FIG. 15 illustrates operations of a subtracter SU and a multiplier MU1.

Subsequently, operations of the subtracter SU and the multiplier MU1 will be described with reference to FIG. 15. The pixel values α at respective positions in input image data are supplied not only to the multiplier MU0 as described above but also to the subtracter SU. The subtracter SU is input with α and "1", and outputs "1−α" as β which is obtained by subtracting α from "1". For example, for the pixel at position coordinates (1, 0), α is "0", and the subtracter SU therefore outputs 1−0=1 as β. Subsequently, for the pixel at position coordinates (1, 1), α is "1", and the subtracter SU therefore outputs 1−1=0 as β. Similarly, for the pixel at position coordinates (1, 2), α is "1", and the subtracter SU therefore outputs a value 1−1=0 as β. For the pixel at position coordinates (1, 3), α is "0.67", and the subtracter SU therefore outputs a value 1−0.67=0.33 as β. β which is output from the subtracter SU is supplied to the multiplier MU1.

The multiplier MU1 is supplied with β from the subtracter SU and is also supplied with background color information from the background color register R2. The multiplier MU1 outputs "β×background color information" which is obtained by multiplying "β" by the background color information, for each corresponding pixel position. That is, if the pixel value α of a pixel in input image data is "0", i.e., if a pixel is in a non-drawn area on which no text image is drawn, β is "1" for the pixel, and the multiplier MU1 directly outputs the background color information. Otherwise, if the pixel value α of a pixel in the input image data is "1", i.e., if a pixel has the highest density among pixels in a drawn area, β is "0" for the pixel, and the multiplier MU1 therefore outputs a value "0". Still otherwise, if the pixel value α of a pixel in the input image data is an intermediate gradation value such as "0.67", i.e., if a pixel has a different density from the highest density among pixels in an area where the text image is drawn, β for the pixel is a pixel value obtained by subtracting the pixel value α from the maximum pixel value. For this pixel, the multiplier MU1 therefore outputs color information indicating a color having a density which is obtained by multiplying a density of a color expressed by color information of a pattern bit value at a corresponding position in hatching pattern data by a density expressed by the pixel value α in input image data. For example, for a pixel at position coordinates (1, 0), β supplied from the subtracter SU is "1", and the multiplier MU1 therefore outputs directly the background color information supplied from the background color register R2. Subsequently, for each of the pixels at position coordinates (1, 1) and (1, 2), β supplied from the subtracter SU is "0", and the multiplier MU1 therefore outputs a value "0". Further, for the pixel at position coordinates (1, 3), β supplied from the subtracter SU is "0.33", and the multiplier MU1 therefore outputs a value "0.33×background color information". "β×background color information" which is output from the multiplier MU1 is supplied to the adder AD.

Figure 16:
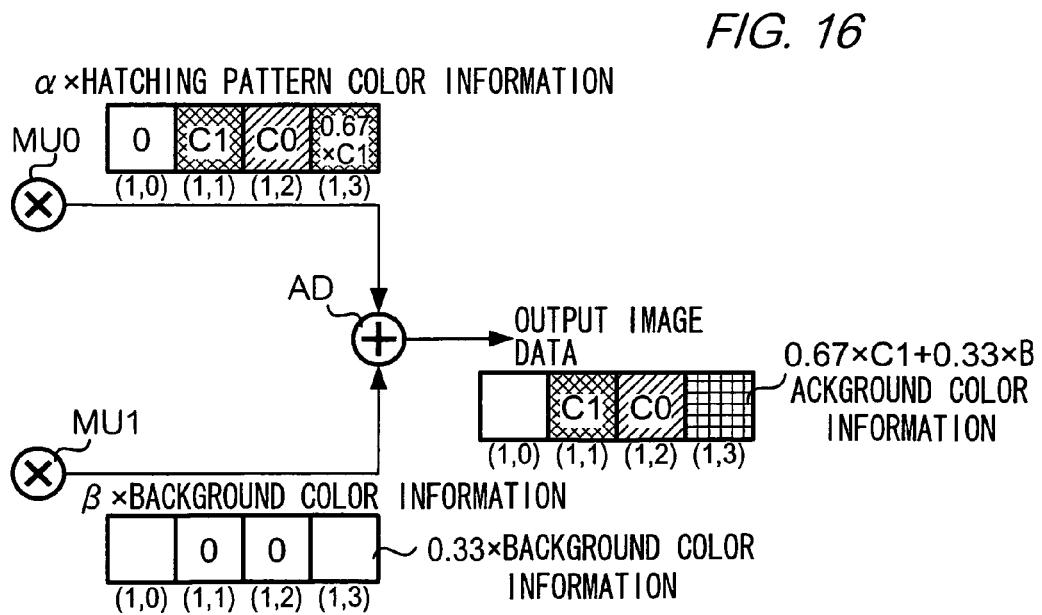
FIG. 16 illustrates an operation of an adder AD.

Next, an operation of the adder AD will be described with reference to FIG. 16. The adder AD outputs a value "α×hatching pattern color information+α×background color information" which is obtained by adding "α×hatching pattern color information" supplied from the multiplier MU0 to "β×background color information" supplied from the multiplier MU1, for each corresponding pixel position. For example, for the pixel at position coordinates (1, 0), the value "α×hatching pattern color information" supplied from the multiplier MU0 is "0", and the value "β×background color information" supplied from the multiplier MU1 is "background color information". Therefore, the adder AD outputs the "background color information". Subsequently, for the pixel at position coordinates (1, 1), the value "α×hatching pattern color information" is C1, and the value "β background color information" is "0". The adder AD therefore outputs the hatching pattern color information C1. Similarly, for the pixel at position coordinates (1, 2), the value "α×hatching pattern color information" is C0, and the value "β×background color information" is "0". The adder AD therefore outputs C0. For the pixel at position coordinates (1, 3), the value "α×hatching pattern color information" is "0.67×C1", and the value "β×background color information" is "0.33×background color information". The adder AD therefore outputs "0.67×C1+0.33×background color information". This value indicates a color obtained by synthesizing a color which is 0.67 times the density of yellow indicated by the hatching pattern color information C1, with a color which is 0.33 times the density of white indicated by the background color information.

That is, the adder AD substitutes pixel values of pixels in specified areas in an input image as shown in FIG. 13 with color information of a hatching pattern. On the other hand, the adder AD substitutes pixel values of pixels in unspecified areas with background color information. The adder AD outputs results of such substitution as output image data. Further, the adder AD substitutes color information of pixels of intermediate gradations among pixels in specified areas in the input image with color information which is obtained by synthesizing color information of the hatching pattern with background color information, depending on densities of the pixels. The output image data which is output from the adder AD is temporarily stored into the VRAM 14, and is then interpreted by the display control device 16. The interpreted output image data is displayed as an image on the image retaining display 15.

Figure 17:
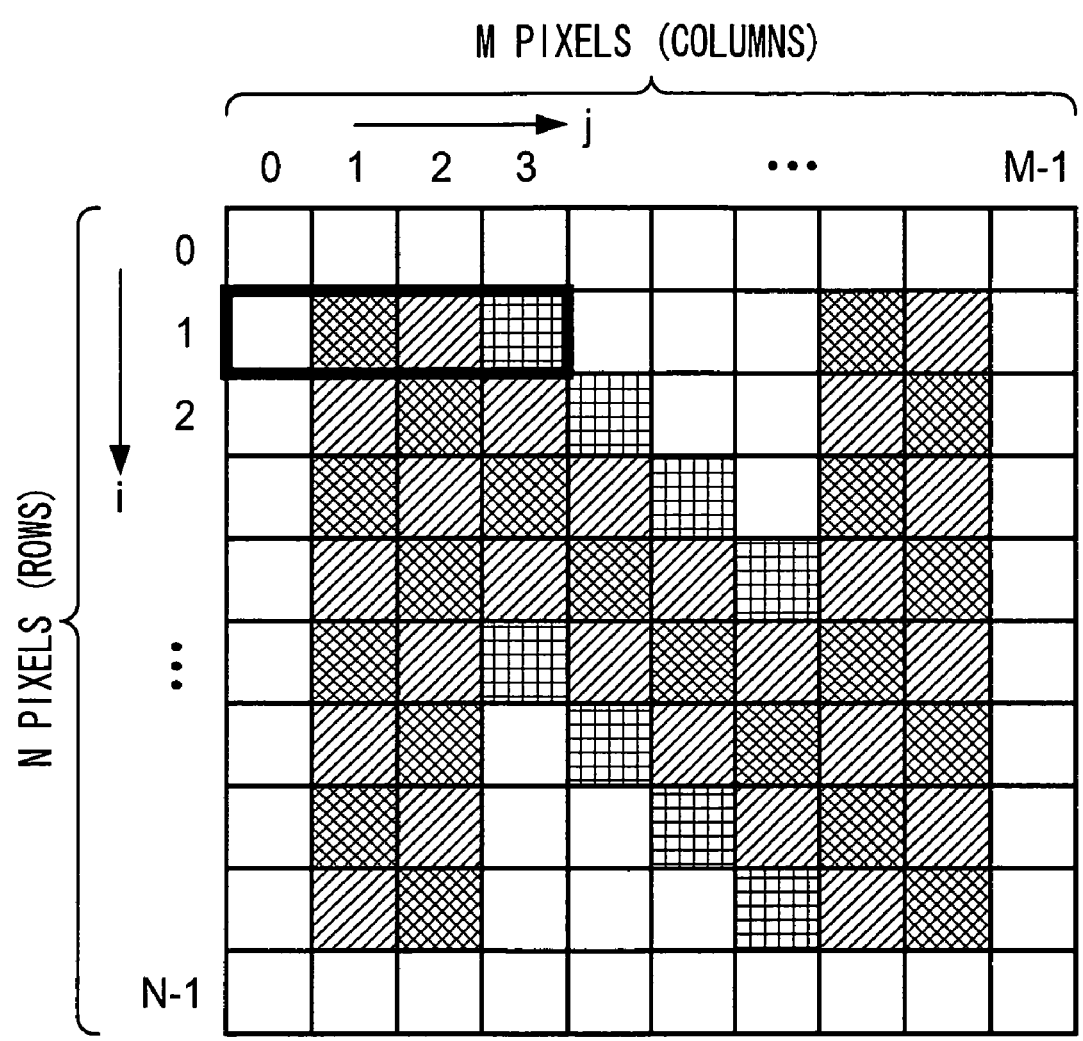
FIG. 17 shows an output image displayed on a memory liquid crystal display 15.

FIG. 17 shows an output image displayed on the image retaining display 15 on the basis of output image data. As shown in the figure, the output image is including a specified area where a text image expressing a letter "N", and an unspecified area where no text image is drawn, as in the input image data shown in FIG. 13. However, the specified area of the text image is painted with a grid pattern including blue and yellow grid blocks, corresponding to the hatching pattern shown in FIG. 3. Further, the unspecified area where the text image is not drawn is not hatched but is painted with a white background image expressed by background color information. In the image area of the text image, intermediate gradation parts where pixel values are intermediate gradation values are painted with a synthesized image in which blue and yellow images corresponding to a hatching pattern are synthesized with a white background image expressed by background color information, depending on densities of the pixels in the intermediate gradation parts. For example, the color of a pixel at position coordinates (1, 0) is white as a background color. The color of a pixel at position coordinates (1, 1) is yellow as indicated by color information C1 of the hatching pattern. Further, the color of a pixel at position coordinates (1, 2) is blue as indicated by color information C0 of the hatching pattern data. The color of a pixel at position coordinates (1, 3) is a color obtained by synthesizing yellow at 67%, which is indicated by color information C1 of the hatching pattern, with white as the background color at 33%, i.e., a color of a hatching pattern which is adjusted to match the background color.

According to the second embodiment as described above, if a processing for laying out shape images in an array within an image area in an input image which includes intermediate gradations, parts of the intermediate gradations can be specified so that the parts may not look unnaturally striking. That is, deterioration in image quality caused by a hatching processing can be suppressed. Only specified areas where letters or the like are drawn in an input image can be hatched by simply using a circuit having a relatively simple configuration which is constituted only of registers, a selector, multipliers, an adder, and a subtracter. Accordingly, it is not necessary to specify every one of the position coordinates or memory addresses of areas as targets to be hatched. Further, hatchings of desired colors can be achieved by merely storing desired colors into the hatching color registers R0 and R1.

2-3. Modifications

The second embodiment has been described above, and content of the second embodiment can be modified as follows. Further, modifications described below may be appropriately combined with each other.

(1) In the second embodiment, details of a hatching processing has been described referring to an example in which hatching pattern data expressing a hatching pattern of a grid pattern as shown in FIG. 3 is stored in the memory H, and input image data expressing a letter "N" as shown in FIG. 13 is input. However, hatchings which can be performed by the hatching circuit 250 are not limited to the example described in the second embodiment. The hatching circuit 250 is capable of performing various hatchings, depending on changes which may be made to the content of the input image and the hatching pattern.

In the second embodiment, a subtraction value output unit outputs β as values obtained by subtracting pixel values at respective positions in input image data from the maximum pixel value of the input image data, and the subtraction value output unit is including the subtracter SU. The subtraction value output unit may be configured in a different configuration from that using the subtracter SU. In brief, the subtraction value output unit may be configured in a different configuration insofar as such values are output as β.

For example, a selector may regard pixel values α of multi-valued input image data, as selection signals. When a selection signal "0" is input, the selector selects and outputs an input signal "1". When a selection signal "1" is input, the selector selects and outputs an input signal "0". When a selection signal "0.67" is input, the selector selects and outputs an input signal "0.33". Thus, a selector which converts a pixel value at each pixel position in input image data into β obtained by subtracting the pixel value from the maximum pixel value of the input image data and outputs β as the converted value can be used as an alternative selector.

(3) The second embodiment exemplifies a case that the hatching circuit 250 is input with multi-valued image data including intermediate gradation values, which are obtained by performing an anti-alias processing on binary image data read from the storage device 23 or the external storage device 24.

The multi-valued image data as a target to be hatched is not limited to image data which is multi-valued by an anti-alias processing. For example, multi-valued image data as a target to be hatched may originally be multi-valued image data expressed by pixel values including intermediate gradations. In this case, the anti-aliasing circuit 255 is not needed.

For example, there may be supposed that multi-valued image data which expresses a rectangular shape having an intermediate gradation is input to the hatching circuit 250 without being subjected to an anti-alias processing. On this supposition, a specified area of the shape in an image of the multi-valued image data is substituted with a synthesized image which is obtained by synthesizing an image corresponding to a hatching pattern with a background image expressed by background color information, depending on a density of the specified area. That is, in the specified area of the shape, image parts corresponding to a hatching pattern translucently overlap the background image. The hatching circuit 250 may be utilized as a circuit which performs a processing as described above.

(4) In the second embodiment, pixel values α of input image data which are converted from multi-valued image data are input to the hatching circuit 250. However, multi-valued image data expressed by 16 gradations of "0" to "15" may be directly input to the hatching circuit 250. In this case, a conversion circuit which converts gradation values of the multi-valued image data into gradation values α of input image data expressed by gradation values of "0" to "1" may be provided in a front end of the multiplier MU0 and the subtracter SU. Pixel values α converted by the conversion circuit may be supplied to the multiplier MU0 and the subtracter SU.

Without providing such a conversion circuit, the multiplier MU0 directly multiplies a value other than "0" by color information of a hatching pattern. Therefore, when the multiplier MU0 performs the multiplication, color information of a hatching pattern is multiplied by an integer. Hence, the color information of the hatching pattern may be multiplied beforehand by "1/an integer".

3. Third Embodiment 3-1. Configuration

Figure 18:
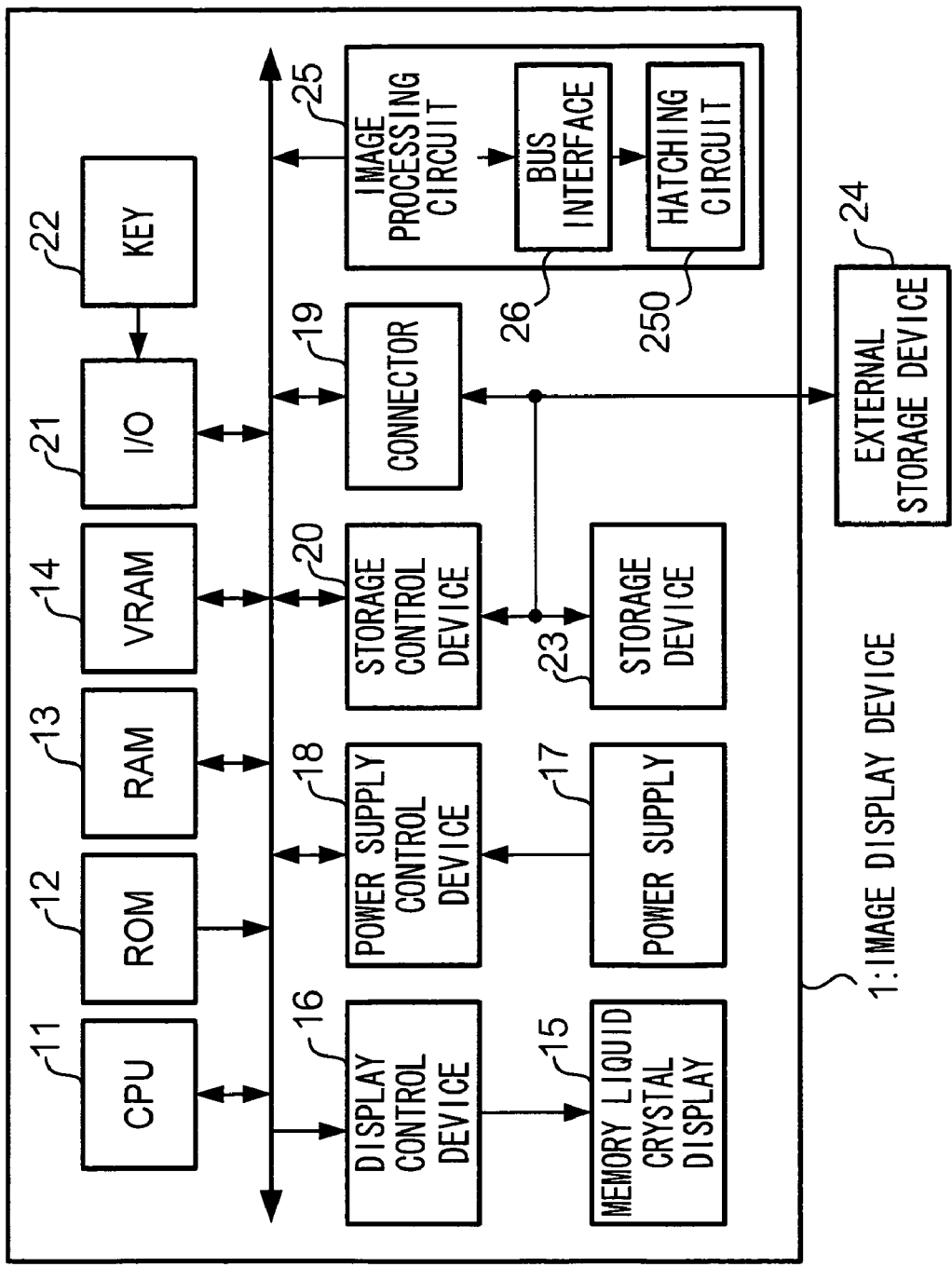
FIG. 18 shows a configuration of another image display device 1.

FIG. 18 shows a configuration of an image display device 1 according to the third embodiment. In this embodiment, image data is a target to be subjected to a hatching processing. The image data is stored outside an image processing circuit 25 for the purpose of allowing users to freely store the image data into a storage device 23 or an external storage device 24, and to freely utilize the image data with ease. For example, if image data is stored in the external storage device 24, users can freely bring out the external storage device 24, and can freely make changes to the content of the image data stored in the external storage device 24.

Figure 19:
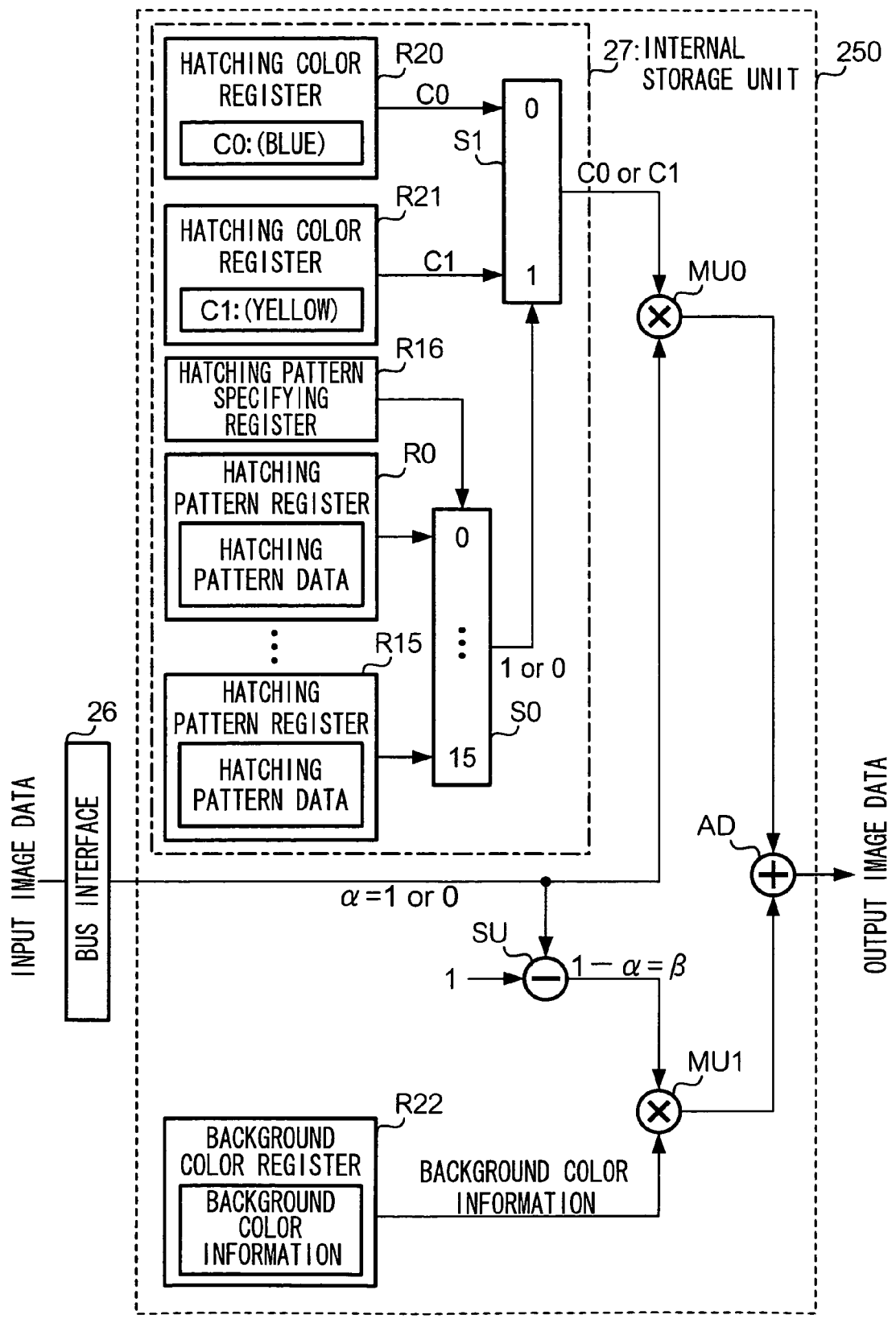
FIG. 19 shows a configuration of a hatching circuit 250.

Next, FIG. 19 shows a configuration of the hatching circuit 250. As shown in the figure, the hatching circuit 250 has hatching pattern registers R0 to R15, a hatching pattern specifying register R16, hatching color registers R20 and R21, a background color register R22, selectors S0 and S1, multipliers MU0 and MU1, a subtracter SU, and an adder AD. These components are connected by transfer channels which are capable of high-speed data transfer. The hatching circuit 250 is input with image data, as input image data, which is read from the storage device 23 or the external storage device 24. In the input image data, a pixel value "0" indicates white (the lowest density), and a pixel value "1" indicates black (the highest density). Further, a result of performing a hatching processing by the hatching circuit 250 on the input image data is output as output image data.

The hatching pattern registers R0 to R15 each store, as hatching pattern data of one of respectively different hatching patterns (corresponding to plural shape-images), positions of pixels constituting the one hatching pattern. For example, the hatching pattern register R0 stores hatching pattern data for performing hatching of a grid pattern. The hatching pattern register R1 stores hatching pattern data for performing hatching of a vertically-striped pattern. The hatching pattern register R2 stores hatching pattern data for performing hatching of a flower pattern. In the descriptions given below, the hatching pattern registers R0 to R15 will be collectively referred to as "hatching pattern registers R" unless the individual hatching pattern registers R0 to R15 particularly need to be distinguished from each other.

In the third embodiment, the hatching pattern data stored in the hatching pattern register R0 is as shown in FIG. 3, for example. Other hatching pattern data stored in each of the other hatching pattern registers R1 to R15 also express plural shape-images in the same manner as described above.

Referring back to FIG. 19, the hatching pattern specifying register R16 stores selection signals for specifying each one of the hatching pattern registers R0 to R15. That is, the hatching pattern specifying register R16 functions as a specifying unit which specifies one of the storage units (as hatching pattern registers R0 to R15). In the third embodiment, selection signals for respectively specifying hatching pattern registers R0 to R15 are supposed to indicate "0" to "15". For example, a selection signal for specifying a hatching pattern register R0 indicates "0". A selection signal for specifying a hatching pattern register R1 indicates "1". A selection signal for specifying a hatching pattern register R2 indicates "2". The selection signals stored in the hatching pattern specifying register R16 may be rewritten by the CPU 11, based on a manipulation of key 22 by a user.

The selector S0 is input with, as an input signal, hatching pattern data stored in one of the hatching pattern registers R0 to R15. The selector S0 is also input with one of the selection signals stored in the hatching pattern specifying register R16. The selector S0 selects and outputs hatching pattern data supplied from the hatching pattern register specified by the selection signal. For example, when "0" is input as a selection signal, the selector S0 selects and outputs hatching pattern data supplied from the hatching pattern register R0. When "1" is input as a selection signal, the selector S0 selects and outputs hatching pattern data supplied from the hatching pattern registers R1.

The hatching color register R20 stores color information expressing a color of each pixel at the position of the pattern bit value "0" in hatching pattern data of each hatching pattern. In this case, color information C0 indicating blue is supposed to be stored. The hatching color register R21 stores color information indicating a color of each pixel at the position of the pattern bit value "1" in hatching pattern data of each hatching pattern. The color information includes information which specifies a color, and a gradation value of the color. However, in the third embodiment, only two values are supposed as gradation values included in the color information, and the two values respectively indicate presence and absence of a color expressed by the color information. With only the color information C0, "blue" is meant, and at the same time, presence of a blue pixel is meant. With the color information C1, "yellow" is meant, and at the same time, presence of a yellow pixel is meant.

The selector S1 is input with, as input signals, the color information C0 stored in the hatching color register R20 and with the color information C1 stored in the hatching color register R21. The selector S1 is sequentially input with pattern bit values included in the hatching pattern data which are output from the selector S0, as a selection signal, in accordance with an order of position coordinates of pixels as described above. The selector S1 selects and outputs color information C0 during a period in which the pattern bit value "0" is input as the selection signal. During a period in which the pattern bit value "1" is input as the selection signal, the selector S1 selects and outputs the color information C1.

Each of the hatching pattern registers R0 to R15 described above functions as a first storage unit which stores positions of respective pixels constituting a hatching pattern. The hatching color registers R20 and R21 each function as a second storage unit which stores color information indicating colors of a hatching pattern, as pixel values of respective pixels constituting the hatching pattern. Further, the selector S1 functions as a color information output unit which outputs color information stored in the hatching color registers R20 and R21, as pixel values of pixels at respective positions, which are stored in one of the hatching pattern registers R0 to R15. In brief, the hatching pattern registers R0 to R15, hatching pattern specifying register R16, selector S0, hatching color registers R20 and R21, and selector S1 operate in cooperation with each other, to function as an internal storage unit 27 which stores positions of respective pixels constituting each of the hatching patterns, and pixel values of the respective pixels.

A bus interface 26 receives image data read from the storage device 23 or the external storage device 24, and supplies the hatching circuit 250 with the image data. That is, the bus interface 26 is provided outside the hatching circuit 250, and functions as an obtaining unit which obtains image data through an external bus provided outside the hatching circuit 250, from an external storage device storing the image data. The bus interface 26 may be provided outside the hatching circuit 250, as shown in the figures, or inside the hatching circuit 250.

The multiplier MU0 is a first multiplication unit, and multiplies color information C0 or C1 output from the selector S1 by the pixel value "0" (white) or "1" (black) included in input image data which is supplied from the bus interface 26, for each corresponding pixel position. The description "corresponding pixel position" indicates identical position coordinates of pixels to those of pixels shown in FIG. 3. The pixel value "0" or "1" will be hereinafter referred to as $\alpha$. That is, the multiplier MU0 is input with C0 or C1 and a, and outputs "$\alpha \times C0$" or "$\alpha \times C1$".

The subtracter SU is input with the value $\alpha$ at each position in the input image data, and a value "1". The subtracter SU subtracts $\alpha$ from the value "1", and outputs obtained "$1-\alpha$" as $\beta$. Accordingly, if $\alpha=1$, the subtracter SU inverts the value "1", and outputs "0". If $\alpha=0$, the subtracter SU inverts "0", and outputs "1". That is, the subtracter SU functions as an inversion unit which inverts pixel values expressed as binary values.

The background color register R22 stores color information indicating a color of unspecified areas when an image expressed by input image data is displayed on the image retaining display 15 (i.e., the color information indicating a color of a background area which forms a background behind an image based on the input image data). The color information expresses, for example, white. The image processing circuit 25 is configured so as to specify an image expressed by the input image data, overlapped on background areas of a predetermined color. Therefore, the background color register R22 stores color information of the background areas. Hereinafter, the color information described above will be referred to as "background color information".

The multiplier MU1 is a second multiplication unit, and multiplies $\beta$ output from the subtracter SU by background color information supplied from the background color register R22, for each corresponding pixel position. That is, "$\beta \times$background color information" is output as color information from the multiplier MU1.

The adder AD adds up "$\alpha \times C0$" or "$\alpha \times C1$" output from the multiplier MU0 and "$\beta \times$background color information" output from the multiplier MU1, for each corresponding pixel position. The adder AD outputs an addition result as output image data. That is, the adder AD outputs color information "$\alpha \times C0 \beta \times$background color information" or "$\alpha \times C1+\beta \times$background color information", as color information included in output image data.

Next, an operation of the hatching circuit 250 will be specifically described. At first, the CPU 11 controls the memory liquid crystal display 15 to show a screen which invites a user to select a hatching pattern. Thus, a selection of a hatching pattern which is made by the user is accepted. For example, the CPU 11 causes the memory liquid crystal display 15 to display enlarged images arrayed on the memory liquid crystal display 15, so that the user can easily see the hatching patterns. The enlarged images are of hatching patterns which are respectively stored in the hatching pattern registers R0 to R15. The user sees the displayed enlarged images, and can then manipulate key 22, to select any of the hatching patterns.

After a hatching pattern is selected by the user, the CPU 11 specifies a hatching pattern register R storing hatching pattern data of the selected hatching pattern. The CPU 11 further writes, into the hatching pattern specifying register R16, a selection signal for specifying the specified hatching pattern register R. For example, if a hatching pattern of a grid pattern as shown in FIG. 3 is selected by the user, a selection signal "0" for specifying the hatching pattern register R0 storing hatching pattern data of the hatching pattern (grid pattern) is written into the hatching pattern specifying register R16. A processing for writing the selection signal is achieved as the CPU 11 executes software pre-stored in the storage device 23.

Next, the CPU 11 reads image data from the storage device 23 or the external storage device 24, and supplies the image data as input image data to the bus interface 26. The bus interface 26 inputs the supplied input image data to the hatching circuit 250.

At this time, the input image data input to the hatching circuit 250 expresses, for example, an input image in which a text image of a letter "L" is drawn, as schematically shown in FIG. 4. This input image is including M pixels (or columns) arrayed in horizontal directions×N pixels (or rows) arrayed in vertical directions, as in the hatching pattern shown in FIG. 3. Pixel values of respective pixels are "0" for a white part in the figure and "1" for a black part. Areas where pixel values are "1" respectively form specified areas where a text image of "L" is drawn. Areas where pixel values are "0" respectively form unspecified areas where the text image is not drawn. Descriptions made below exemplify an operation in a case where a selection signal "0" for specifying the hatching pattern register R0 is written into the hatching pattern specifying register R16, as described above, and the input image data as shown in FIG. 4 is input to the hatching circuit 250.

Figure 20:
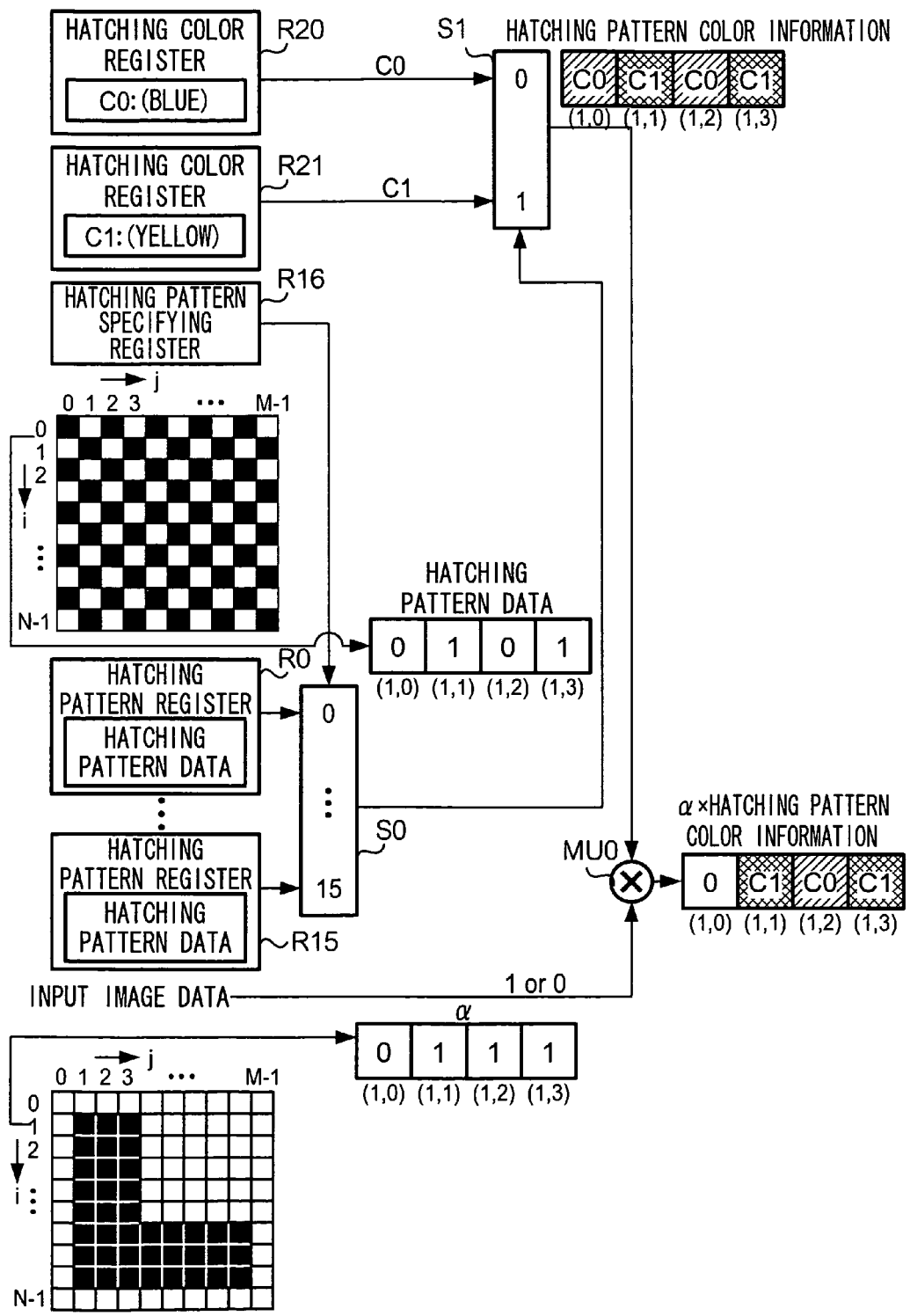
FIG. 20 illustrates operations of selectors S0 and S1 and a multiplier MU.

At first, operations of the selectors S0 and S1 and the multiplier MU0 will be described with reference to FIG. 20. Pixel values of input image data shown in FIG. 4 are input as α to the hatching circuit 250 in accordance with an order of position coordinates. For example, the pixel value α of a pixel at position coordinates (0, 0) in input image data is "0", and this value "0" is therefore input. Next, the pixel value α of a pixel at position coordinates (0, 1) in the input image data is "0", too, and this value "0" is input. Similarly, remaining pixel values α on the uppermost row of the input image data shown in FIG. 4 are sequentially input to the hatching circuit 250 in an order of position coordinates (0, 2), (0, 3), . . . , to (0, M−1). After pixel values of pixels on the uppermost row are all input in this manner, pixel values at position coordinates (1, 0), (1, 1), (1, 2), . . . , (1, M−1) on the second uppermost row are sequentially input as α to the hatching circuit 250. At this time, pixel values of pixels at position coordinates (1, 0), (1, 1), (1, 2), and (1, 3) are respectively "0", "1", "1", and "1". FIG. 20 shows an example of a state where these pixel values are sequentially input.

In parallel with input operations as described above, the selector S0 is input with hatching pattern data read from each of the hatching pattern registers R0 to R15, as an input signal, and a selection signal stored in the hatching pattern specifying register R16, as a selection signal. In this example, a selection signal "0" is written in the hatching pattern specifying register R16, and the selection signal "0" is supplied to the selector S0. The selector S0 selects and outputs hatching pattern data which is read from the hatching pattern register R0 specified by the selection signal "0", i.e., the hatching pattern data as shown in FIG. 3. Accordingly, for the pixel at position coordinates (1, 0) in the hatching pattern data, the selector S0 outputs a pattern bit value "0". For the pixel at position coordinates (1, 1) in the hatching pattern data, the selector S0 outputs a pattern bit value "1". Similarly, for the pixel at position coordinates (1, 2) in the hatching pattern data, the selector S0 outputs a pattern bit value "0". The pattern bits which are output from the selector S0 are sequentially supplied to the selector S1.

The selector S1 is input with, as input signals, the color information C0 read from the hatching color register R20 and with the color information C1 read from the hatching color register R21. The selector S1 is also supplied with, as a selection signal, pattern bit values which are output from the selector S0. The selector S1 selects and outputs the color information C0 during a period in which "0" is input as the selection signal. During a period in which "1" is input as the selection signal, the selector S1 selects and outputs the color information C1. For example, the pattern bit value is "0" for a pixel at position coordinates (1, 0) in hatching pattern data, and the selector S1 therefore outputs the color information C0 for this pixel. Subsequently, the pattern bit value is "1" for a pixel at position coordinates (1, 1) in the hatching pattern data, and the selector S1 therefore outputs the color information C1. Similarly, the pattern bit value is "0" for a pixel at position coordinates (1, 2) in the hatching pattern data, and the selector S1 therefore outputs the color information C0 for this pixel. Further, the pattern bit value is "1" for a pixel at position coordinates (1, 3) in the hatching pattern data, and the selector S1 therefore outputs the color information C1. The color information which is thus output is sequentially supplied to the multiplier MU0.

The multiplier MU0 is input with pixel values α at respective positions in input image data, and with the color information C0 or C1 supplied from the selector S1. That is, the selector S0 described above functions as a supply unit which supplies the first multiplication unit with pixel values at respective positions, which are read from the storage unit specified by the specifying unit. The multiplier MU0 multiplies the pixel value α at each position in the input image data by the color information C0 or C1 supplied from the selector S1, for each corresponding pixel position, and outputs "α×C0" or "α×C1". For example, for the pixel at position coordinates (1, 0), α is "0" and the color information is C0. The multiplier MU0 therefore outputs a value 0×C0="0". Subsequently, for the pixel at position coordinates (1, 1), α is "1" and the color information is C1. The multiplier MU0 therefore outputs 1×C1=C1, i.e., outputs directly the color information C1 supplied from the selector S1. Similarly, for the pixel at position coordinates (1, 2), α is "1", and the multiplier MU0 therefore outputs the color information C0 supplied from the selector S1. For the pixel at position coordinates (1, 3), α is "1", and the multiplier MU0 therefore outputs the color information C1 supplied from the selector S1. In this manner, if a pixel value of a pixel in input image data is "0" as a result of multiplication by the multiplier MU0, i.e., if a pixel is in an unspecified area where no text image is drawn, the multiplier MU0 outputs a value "0" for the pixel. On the other hand, if the pixel value of a pixel in the input image data is "1", i.e., if a pixel is in a specified area where a text image is drawn, the multiplier MU0 outputs the color information of a pattern bit value at a corresponding position in hatching pattern data, for the pixel. "α×C0" or "α×C1", i.e., the color information "α×hatching pattern color information" which is output from the multiplier MU0 is supplied to the adder AD.

3-2. Operation

Next, operations of the subtracter SU and the multiplier MU1 will be described with reference to FIG. 6. The pixel values α at respective positions in input image data are supplied not only to the multiplier MU0 as described above but also to the subtracter SU. The subtracter SU is input with α and "1", and outputs "1−α" as β which is obtained by subtracting α from "1". For example, for the pixel at position coordinates (1, 0), α is "0", and the subtracter SU therefore outputs 1−0=1 as β. Subsequently, for the pixel at position coordinates (1, 1), α is "1", and the subtracter SU therefore outputs 1−1=0 as β. Similarly, for the pixel at position coordinates (1, 2), α is "1", and the subtracter SU therefore outputs a value 1−1=0 as β. For the pixel at position coordinates (1, 3), α is "1", and the subtracter SU therefore outputs a value 1−1=0 as β. β which is output from the subtracter SU is supplied to the multiplier MU1.

The multiplier MU1 is supplied with β from the subtracter SU and is also supplied with background color information from the background color register R22. The multiplier MU1 outputs "β×background color information" obtained by multiplying β by the background color information, for each corresponding pixel position. That is, if a pixel value of a pixel in input image data is "0", i.e., if a pixel is in an unspecified area in which no text image is drawn, β is "1" for this pixel, and the multiplier MU1 directly outputs the background color information. On the other hand, if a pixel value of a pixel in the input image data is "1", i.e., if a pixel is in a specified area in which a text image is drawn, β is "0" for this pixel, and the multiplier MU1 therefore outputs the value "0". For example, for a pixel at position coordinates (1, 0), β supplied from the subtracter SU is "1", and the multiplier MU1 therefore directly outputs the background color information supplied from the background color register R22. For each of the subsequent pixels at position coordinates (1, 1), (1, 2), and (1, 3), β supplied from the subtracter SU is "0", and the multiplier MU1 therefore outputs a value "0". "β×background color information" which is output from the multiplier MU1 is supplied to the adder AD.

Next, an operation of the adder AD will be described with reference to FIG. 7. The adder AD adds up "α×hatching pattern color information" supplied from the multiplier MU0 to "β×background color information" supplied from the multiplier MU1, for each corresponding pixel position, and outputs a value "α×hatching pattern color information+β×background color information". For example, for the pixel at position coordinates (1, 0), the value "α×hatching pattern color information" supplied from the multiplier MU0 is "0", and the value "β×background color information" supplied from the multiplier MU1 is "background color information". Therefore, the adder AD outputs the "background color information". Subsequently, for the pixel at position coordinates (1, 1), the value "α×hatching pattern color information" is C1, and the value "β×background color information" is "0". The adder AD therefore outputs the hatching pattern color information C1. Similarly, for the pixel at position coordinates (1, 2), the value "α×hatching pattern color information" is C0, and the value "β×background color information" is "0". The adder AD therefore outputs C0. For the pixel at position coordinates (1, 3), the value "α×hatching pattern color information" is C1, and the value "β×background color information" is "0". The adder AD therefore outputs the hatching pattern color information C1. That is, the adder AD substitutes color information indicating colors of pixels in specified areas in an input image as shown in FIG. 4 with color information of a hatching pattern. On the other hand, the adder AD substitutes color information indicating colors of pixels in unspecified areas with background color information. Results of such substitution are output as output image data. The output image data which is output from the adder AD is temporarily stored into the VRAM 14, and is thereafter interpreted by the display control device 16. The interpreted output image data is then displayed as an image on the image retaining display 15.

An output image displayed on the memory liquid crystal display 15 on the basis of output image data is, for example, as shown in FIG. 8. As shown in the figure, the output image is including a specified area where a text image expressing a letter "L" is drawn, and an unspecified area where no text image is drawn, as in the input image data shown in FIG. 4. However, the specified area of the text image is painted with a grid pattern including blue and yellow grid blocks, corresponding to the hatching pattern shown in FIG. 3. Further, the unspecified area where the text image is not drawn is not hatched but is painted with a white background image expressed by background color information. For example, the color of a pixel at position coordinates (1, 0) is white as a background color. The color of a pixel at position coordinates (1, 1) is yellow as expressed by color information C1 of the hatching pattern. Further, the color of a pixel at position coordinates (1, 2) is blue as expressed by color information C0 of the hatching pattern data. The color of a pixel at position coordinates (1,3) is yellow as expressed by color information C1 of the hatching pattern.

The above descriptions have been made with reference to an example of an operation in a case where a hatching pattern of a grid pattern as shown in FIG. 3 is selected. In a case where another hatching pattern is selected, the operation proceeds as follows. For example, if a user selects a hatching pattern of a vertically-striped pattern, a selection signal "1" for selecting the hatching pattern register R1 storing hatching pattern data expressing the vertically-striped pattern is written into the hatching pattern register R16. The selector S0 selects and outputs the hatching pattern data which is read out from the hatching pattern register R1 specified by the selection signal "1". Accordingly, hatching of the vertically-striped pattern selected by the user is performed on specified areas in a text image.

Otherwise, if a user selects a hatching pattern of a flower pattern, a selection signal "2" for selecting the hatching pattern register R2 storing hatching pattern data expressing the flower pattern is written into the hatching pattern register R16. The selector S0 selects and outputs the hatching pattern data which is read out from the hatching pattern register R2 specified by the selection signal "2". Accordingly, hatching of the flower pattern selected by the user is performed on specified areas in a text image.

According to the third embodiment as described above, a hatching processing can be performed at a higher speed only on specified areas where letters are drawn in an input image, by simply using a circuit having a relatively simple configuration which is constituted only of registers, selectors, multipliers, an adder, and a subtracter, compared with another case where hatching pattern data is input through an external bus. In addition, it is not necessary to specify every one of the position coordinates or memory addresses of areas as targets to be hatched. Further, users can select, from among plural hatching patterns, a desired hatching pattern to be used for hatching on specified areas. Further, hatchings of desired colors can be achieved by merely storing desired colors into the hatching color registers R20 and R21.

3-3. Modifications

The third embodiment has been described above, and the content of the third embodiment can be modified as follows. Further, modifications described below may be appropriately combined with each other.

(1) In the third embodiment described above, the hatching circuit 250 is provided with 16 hatching pattern registers R0 to R15. The number of hatching pattern registers R0 to R15 may be greater or smaller than 16. For example, the hatching circuit 250 may be provided with fifty hatching pattern registers or only one hatching pattern register. However, if the hatching circuit 250 is provided with only one hatching pattern register, neither the hatching pattern specifying register R16 nor selector S0 is needed, but hatching pattern data stored in the only one hatching pattern register is directly supplied to the selector S1.

(2) In the third embodiment, hatching pattern data is pre-stored in each of the hatching pattern registers R. The hatching pattern data can be rewritten by the CPU 11. Accordingly, a hatching pattern to be used in hatching which the hatching circuit 250 performs can be changed afterward. Hatching pattern data which can be written into any of the hatching pattern registers R may be image data of an image which a user has drawn by using drawing software. In this case, the hatching circuit 250 can perform a hatching on the image drawn by the user.

(3) The third embodiment is configured so that the hatching circuit 250 performs a hatching with a hatching pattern selected by a user. However, the invention is not limited to this configuration. For example, the CPU 11 may randomly select a hatching pattern. In this case, a selection signal for specifying a hatching pattern register R storing hatching pattern data expressing a hatching pattern selected by the CPU 11 is written into the hatching pattern specifying register R16. Accordingly, the hatching circuit 250 can perform hatching with use of the hatching pattern selected at random by the CPU 11.

Further, the CPU 11 may analyze the content of input image data which is input to the hatching circuit 250, and may select a hatching pattern which has been predetermined for the analyzed content, from among hatching patterns which are respectively predetermined for each individual content. For example, if input image data expresses a text image, the CPU 11 may select a hatching pattern of a grid pattern. Otherwise, if input image data expresses a shape-image, the CPU 11 may select a hatching pattern of a flower pattern. In the former case where the CPU 11 selects a hatching pattern of a grid pattern, a selection signal for specifying the hatching pattern register R0 storing hatching pattern data expressing a grid pattern is written into the hatching pattern specifying register R16. In the latter case if the CPU 11 selects a hatching pattern of a flower pattern, a selection signal for specifying the hatching pattern register R2 storing hatching pattern data expressing a flower pattern is written into the hatching pattern specifying register R16. In this manner, the hatching circuit 250 can perform hatchings with different hatching patterns, depending on the content of the input image data.

(4) Areas other than the hatching target areas are, in brief, background areas. Background color information stored in the background color register R22 may be used as image data to be displayed in the background areas, as in the above third embodiment, or input image data which is input to the hatching circuit 250 may be used as the image data to be displayed in the background area. In the latter case, the circuit configuration of the third embodiment may be arranged so that the multiplier MU1 is supplied with input image data in place of the background color information read from the background color register R22. With such a circuit configuration, the color of the background areas in an output image can be the same as that of the background areas in an input image.

Alternatively, either the background color information stored in the background color register R22 or the input image data input to the hatching circuit 250 may be specified.

Figure 21:
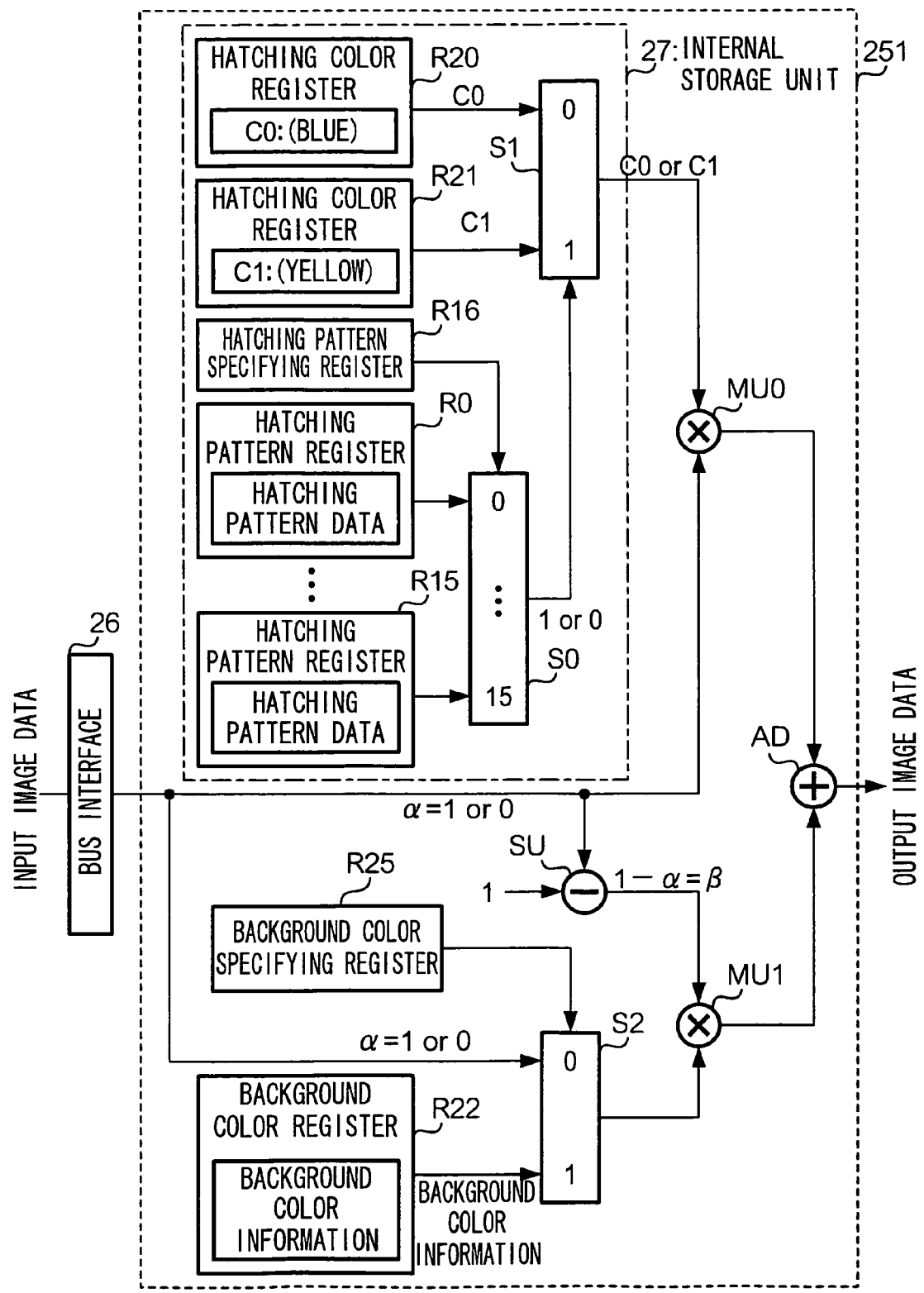
FIG. 21 shows a configuration of a hatching circuit 251 according to a modification.

FIG. 21 shows a hatching circuit 251 in this case. The hatching circuit 251 is additionally provided with a background color specifying register R25 and a selector S2. The other features of the configuration are the same as those of the configuration of the hatching circuit 250 shown in FIG. 19.

The background color specifying register R25 stores a selection signal for specifying either the pixel value α at each position in input image data or background color information stored in the background color register R22. That is, the background color specifying register R25 functions as a specifying unit that specifies either a pixel value at each position in binary input image data or a pixel value at each position in background color information. The selection signal stored in the background color specifying register R25 may be rewritten by the CPU 11, on the basis of a manipulation of the key 22 by a user.

The selector S2 is input with, as input signals, the pixel value α in input image data, and background color information stored in the background color register R22. The selector S2 is also input with the selection signal stored in the background color specifying register R25. When a selection signal specifying the pixel value α ("0" in this case) at each position in input image data is input, the selector S2 then selects and outputs the pixel value α in the input image data. On the other hand, when a selection signal specifying background color information ("1" in this case) stored in the background color register R22 is input, the selector S2 then selects and outputs the background color information. That is, the selector S2 functions as a supply unit which supplies the multiplier MU1 as a second multiplication unit with the pixel value specified by the background color specifying register R25.

Accordingly, a color of unspecified areas in an input image or a background color can be specified as a color of background areas in an output image.

(5) In the above third embodiment, background color information stored in the background color register R22 is directly supplied to the multiplier MU1. If background color information is stored in the VRAM 14 in addition to the background color register R22, either the background color information in the VRAM 14 or the register R22 may be selected and supplied to the multiplier MU1.

Figure 22:
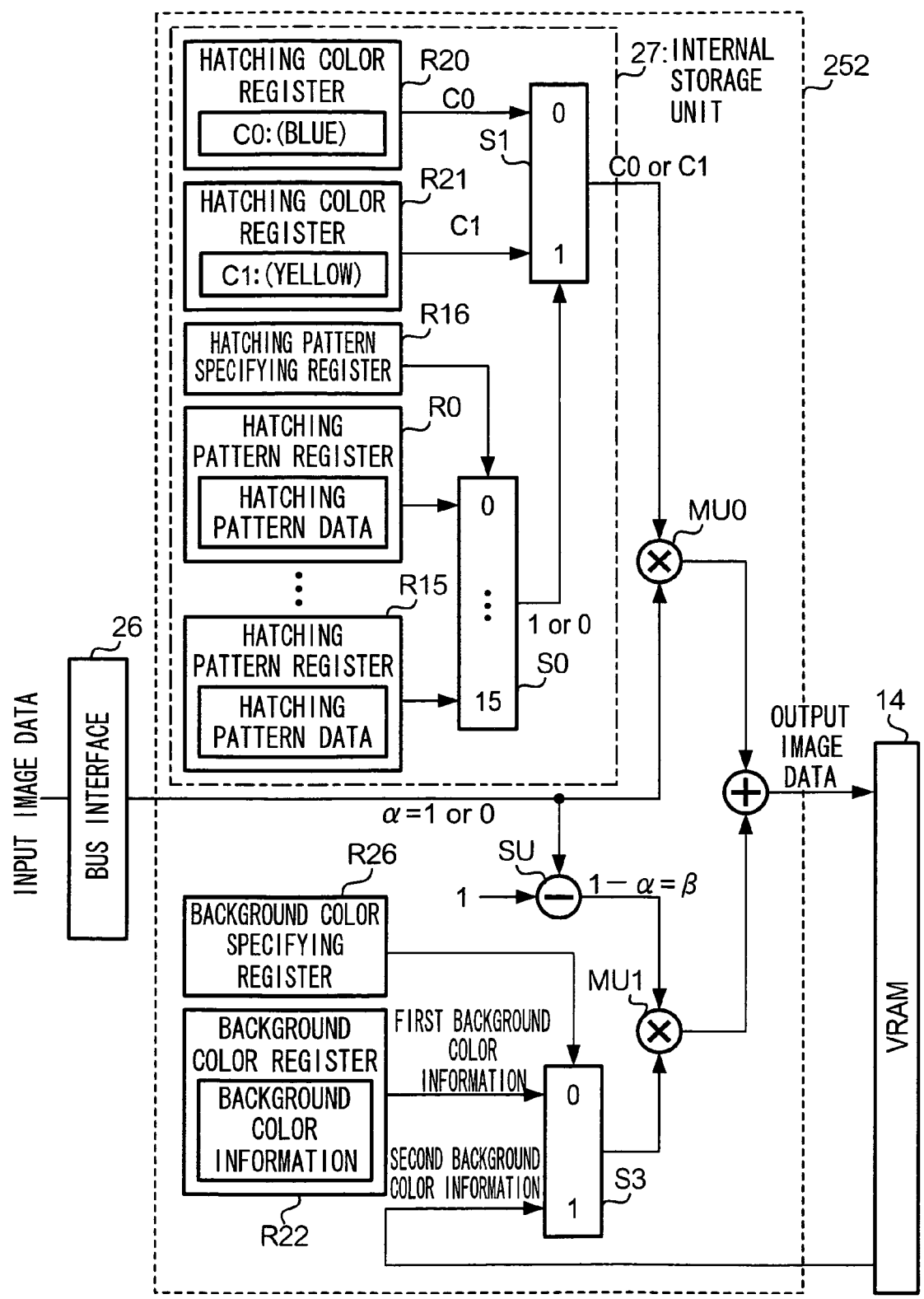
FIG. 22 shows a configuration of a hatching circuit 252 according to a modification.

FIG. 22 shows a configuration of a hatching circuit 252 according to the modification. The hatching circuit 252 is additionally provided with a background color specifying register R26 and a selector S3. The other features of the configuration are the same as those of the configuration of the hatching circuit 250 shown in FIG. 19.

The background color specifying register R26 stores a selection signal for specifying either first background color information stored in the background color register R22 or second background color information stored in the VRAM 14. That is, the background color specifying register R26 functions as a specifying unit that specifies either the background color register R22, which stores predetermined first background color information, or the VRAM 14 on which image information to be output to the image retaining display 15 is developed. The selection signal stored in the background color specifying register R26 may be rewritten by the CPU 11, on the basis of a manipulation of key 22 by a user.

The selector S3 is input with, as input signals, the first background color information stored in the background color register R22 and the second background color information stored in the VRAM 14. The selector S3 is also input with the selection signal stored in the background color specifying register R26. When a selection signal ("0" in this case) specifying the background color register R22 is input, the selector S3 then selects and outputs the first background color information read from the background color register R22. On the other hand, when a selection signal ("1" in this case) specifying the VRAM 14 is input, the selector S1 then selects the second background color information read from the VRAM 14. That is, the selector S3 functions as a supply unit which reads information stored in a storage unit specified by the background color specifying register R26, i.e., information stored in the background color register R22 or in the VRAM 14, as a pixel value included in the background color information. The selector S3 as a supply unit supplies the multiplier MU1 as a second multiplication unit with the read information.

If an image is output (or displayed or printed) by a display unit or a printing unit, image information of the output image is developed on a storage unit such as the RAM 13, and is further supplied to the display unit or the printing unit after being temporarily stored into the RAM 13. Image information of the output image stored in the RAM 13 may be used as background color information in the third embodiment described above. In this case, the background color specifying register R26 functions as a specifying unit which specifies either the background color register R22 storing the predetermined first background color information or the RAM 13 storing image information of an output image. Further, the selector S3 functions as a supply unit which reads, as a pixel value of the background color information in the third embodiment, the background color information or the image information stored in the storage unit specified by the background color specifying register R26, i.e., stored in the background color register R22 or the RAM 13. The selector S3 as a supply unit further supplies the multiplier MU1 as a second multiplication unit with the read information. Accordingly, a storage unit such as the RAM 13 can be selected as a supply source of background color information.

Any two of the first to the third embodiment and their modifications may be combined.

What is claimed is:

1. An image processing circuit comprising:
   a storage unit that stores positions of respective pixels, and pixel values of the pixels, the pixels forming a plurality of shape-images which are to be laid out in an array;
   a first multiplication unit that multiplies a pixel value from among the pixel values stored in the storage unit, by a pixel value from among pixel values included in input image data, for each of the respectively corresponding positions to both the positions stored and positions of pixels included in the input image data, the input image data expressing the pixel values;
   a subtraction value output unit that outputs a pixel value which is obtained by subtracting a pixel value at each of the positions in the input image data, from a maximum pixel value in the input image data;
   a second multiplication unit that multiplies a pixel value from among the pixel values included in the input image data or a pixel value included in background image data, by the pixel value output from the subtraction value output unit, for each of the respectively corresponding positions, the background image data being a background of an image based on the input image data; and
   an adder unit that adds up a multiplication result of the first multiplication unit and a multiplication result of the second multiplication unit, for each of the respectively corresponding positions, and outputs addition results as output image data.

2. The image processing circuit according to claim 1, wherein the storage unit includes:
   a first storage unit that stores the positions of the respective pixels forming the plurality of shape-images;
   a second storage unit that stores color information indicating a color of the shape images, as a pixel value of each of the pixels forming the plurality of shape-images; and
   a color information output unit that outputs the color information stored in the second storage unit, as a pixel value of each of the pixels at the positions stored in the first storage unit.

3. The image processing circuit according to claim 2, wherein
   the second storage unit stores plural types of color information, and
   the color information output unit outputs one of the plural types of color information stored in the second storage unit, for each of the pixels forming one type of the plurality of shape images among the plural shape images.

4. The image processing circuit according to claim 1, further comprising:
   a specifying unit that specifies either a pixel value at each of the positions in the input image data or a pixel value at each of the positions in the background image data expressing the background of the image of the input image data; and
   a supply unit that supplies the second multiplication unit with the pixel value specified by the specifying unit.

5. The image processing circuit according to claim 1, further comprising:
   a specifying unit that specifies either a third storage unit that stores predetermined background color information or a fourth storage unit that stores image information to be output to a display unit or a printing unit; and
   a supply unit that reads information stored in the third or fourth storage unit specified by the specifying unit, as pixel values included in the background image data, and supplies the second multiplication unit with the pixel values.

6. The image processing circuit according to claim 1, wherein:
   the input data expresses the pixel values by using two values including zero.

7. The image processing circuit according to claim 1, wherein:
   the input data expresses the pixel values by using multiple values including zero.

8. The image processing circuit according to claim 1, further comprising:
   an obtaining unit that is provided outside the image processing circuit, obtains input image data from an external storage unit through an external bus provided outside the image processing circuit, the external storage unit storing the input image data,
   wherein
   the storage unit is an internal storage unit that is provided inside the image processing circuit, and
   the first multiplication unit is configured to multiply a pixel value from among pixel values included in the input image data obtained by the obtaining unit, by a pixel value which is read out from the internal storage unit, for each of respectively corresponding positions to both positions of pixels in the input image data and the positions of the pixels stored in the internal storage unit.

9. The image processing circuit according to claim 8, wherein
- a plurality of the internal storage units store the positions of the pixels and the pixel values at the positions, respectively for the plurality of shape-images,
- a specifying unit that specifies one of the plurality of the internal storage units,
- the image processing circuit further comprises a supply unit that supplies the first multiplication unit with a pixel value at each of the positions, which is read from the one of the plurality of the internal storage units, specified by the specifying unit, and
- the first multiplication unit multiplies the pixel value supplied from the supply unit, by a pixel value from among the pixel values included in the input image data obtained by the obtaining unit, for each of the respectively corresponding positions.

10. The image processing circuit according to claim 9, wherein the plurality of internal storage units include:
- a first storage unit that stores the positions of the respective pixels forming the plurality of shape-images;
- a second storage unit that stores color information indicating a color of the shape images, as a pixel value of each of the pixels forming the plurality of shape images; and
- a color information output unit that outputs the color information stored in the second storage unit, as a pixel value of each of the pixels at the positions stored in the first storage unit.

11. The image processing circuit according to claim 10, wherein
- the second storage unit stores plural types of color information, and
- the second storage unit outputs one of the plural types of color information stored in the second storage unit, for each of the pixels forming one type of the plurality of shape images among the plural shape images.

12. The image processing circuit according to claim 8, further comprising:
- a specifying unit that specifies either a pixel value at each of the positions in the input image data or a pixel value at each of the positions in the background image data expressing the background of the image of the input image data; and
- a supply unit that supplies the second multiplication unit with the pixel value specified by the specifying unit.

13. The image processing circuit according to claim 8, further comprising:
- a specifying unit that specifies either a third storage unit that stores predetermined background color information or a fourth storage unit that stores image information to be output to a display unit or a printing unit; and
- a supply unit that reads information stored in the third or fourth storage unit specified by the specifying unit, as pixel values included in the background image data, and supplies the second multiplication unit with the pixel values.

14. A display device comprising:
the image processing circuit according to claim 1; and
a display unit that displays an image, based on the output image data which is output from the adder unit.

15. A printing device comprising:
the image processing circuit according to claim 1; and
a display unit that prints out an image, based on the output image data which is output from the adder unit.

* * * * *